(12) United States Patent
McVeigh et al.

(10) Patent No.: US 7,917,537 B2
(45) Date of Patent: Mar. 29, 2011

(54) SYSTEM AND METHOD FOR PROVIDING LINK PROPERTY TYPES FOR CONTENT MANAGEMENT

(75) Inventors: Ryan Sean McVeigh, Broomfield, CO (US); Steven L. Roth, Westminster, CO (US); Jalpesh Patadia, Boulder, CO (US); Tanya Saarva, Boulder, CO (US); Xiaojiang Zhou, Broomfield, CO (US); Brad Posner, Erie, CO (US)

(73) Assignee: Oracle International Corporation, Redwood Shores, CA (US)

( * ) Notice: Subject to any disclaimer, the term of this patent is extended or adjusted under 35 U.S.C. 154(b) by 220 days.

(21) Appl. No.: 11/438,164

(22) Filed: May 22, 2006

(65) Prior Publication Data

US 2007/0073744 A1       Mar. 29, 2007

Related U.S. Application Data

(60) Provisional application No. 60/720,860, filed on Sep. 26, 2005.

(51) Int. Cl.
  *G06F 17/30* (2006.01)
(52) U.S. Cl. .................................. 707/802; 707/792
(58) Field of Classification Search .................. 707/802, 707/792, 999.101, 999.104
  See application file for complete search history.

(56) References Cited

U.S. PATENT DOCUMENTS

| | | | |
|---|---|---|---|
| 5,163,131 A | 11/1992 | Row et al. | |
| 5,173,939 A | 12/1992 | Abadi | |
| 5,237,614 A | 8/1993 | Weiss | |
| 5,335,345 A | 8/1994 | Frieder et al. | |
| 5,341,478 A | 8/1994 | Travis, Jr. et al. | |
| 5,347,653 A | 9/1994 | Flynn et al. | |

(Continued)

FOREIGN PATENT DOCUMENTS

EP   697662   2/1996

(Continued)

OTHER PUBLICATIONS

Adya, Atul, et al., "Farsite: Federated, Available, and Reliable Storage for an Incompletely Trusted Environment," ACM SIGOPS Operating Systems Review, vol. 36, Issue SI (Winter 2002), OSDI '02, Proceedings of the 5th Symposium on Operating Systems Design and Implementation, pp. 1-14.

(Continued)

*Primary Examiner* — Hung T Vy
*Assistant Examiner* — Phuong-Thao Cao
(74) *Attorney, Agent, or Firm* — Fliesler Meyer LLP

(57) ABSTRACT

In accordance with embodiments, there are provided mechanisms and methods for providing linked property types in a content management system. These mechanisms and methods for providing linked property types in a content management system can enable users to specify a new property definition type, which refers to another node instance in the content management system. By specifying a link property definition type on a type, the user can then relate a node instance of the modeled type (link source) to any other node instance (link target) in the system. For example, a user can create a type Article with property definitions such as title, body and authorLink. The authorLink property definition can be a link type property definition. Then the user could define an Author content type. When an instance of an Article is created (anArticle), the authorLink property associated with anArticle could refer to a node instance of an Author.

16 Claims, 8 Drawing Sheets

U.S. PATENT DOCUMENTS

| | | | |
|---|---|---|---|
| 5,355,474 A | 10/1994 | Thuraisngham et al. |
| 5,369,702 A | 11/1994 | Shanton |
| 5,426,747 A | 6/1995 | Weinreb et al. |
| 5,481,700 A | 1/1996 | Thuraisingham |
| 5,544,322 A | 8/1996 | Cheng et al. |
| 5,557,747 A | 9/1996 | Rogers et al. |
| 5,619,710 A | 4/1997 | Travis, Jr. et al. |
| 5,627,886 A | 5/1997 | Bowman |
| 5,649,195 A | 7/1997 | Scott et al. |
| 5,671,360 A | 9/1997 | Hambrick et al. |
| 5,757,669 A | 5/1998 | Christie et al. |
| 5,758,355 A | 5/1998 | Buchanan |
| 5,771,379 A | 6/1998 | Gore |
| 5,797,128 A | 8/1998 | Birnbaum |
| 5,806,066 A | 9/1998 | Golshani et al. |
| 5,825,883 A | 10/1998 | Archibald et al. |
| 5,826,000 A | 10/1998 | Hamilton |
| 5,826,268 A | 10/1998 | Schaefer et al. |
| 5,838,909 A | 11/1998 | Roy et al. |
| 5,848,396 A | 12/1998 | Gerace |
| 5,867,667 A | 2/1999 | Butman et al. |
| 5,872,928 A | 2/1999 | Lewis et al. |
| 5,873,088 A | 2/1999 | Hiyashi et al. |
| 5,889,953 A | 3/1999 | Thebaut et al. |
| 5,911,143 A | 6/1999 | Deinhart et al. |
| 5,918,210 A | 6/1999 | Rosenthal et al. |
| 5,925,136 A | 7/1999 | Watts |
| 5,941,947 A | 8/1999 | Brown et al. |
| 5,950,195 A | 9/1999 | Stockwell et al. |
| 5,954,798 A | 9/1999 | Shelton et al. |
| 5,956,400 A | 9/1999 | Chaum et al. |
| 5,956,719 A | 9/1999 | Kudo et al. |
| 5,966,707 A | 10/1999 | Van Huben et al. |
| 5,987,469 A | 11/1999 | Lewis et al. |
| 5,987,611 A | 11/1999 | Freund |
| 5,991,735 A | 11/1999 | Gerace |
| 5,991,877 A | 11/1999 | Luckenbaugh |
| 6,005,571 A | 12/1999 | Pachauri |
| 6,006,194 A | 12/1999 | Merel |
| 6,006,265 A | 12/1999 | Rangan et al. |
| 6,009,410 A | 12/1999 | Lemole et al. |
| 6,014,666 A | 1/2000 | Helland et al. |
| 6,023,765 A | 2/2000 | Kuhn |
| 6,026,433 A | 2/2000 | D'Arlach et al. |
| 6,029,144 A | 2/2000 | Barrett et al. |
| 6,029,182 A | 2/2000 | Nehab et al. |
| 6,029,196 A | 2/2000 | Lenz |
| 6,054,910 A | 4/2000 | Tada et al. |
| 6,055,515 A | 4/2000 | Consentino et al. |
| 6,055,637 A | 4/2000 | Hudson et al. |
| 6,058,392 A | 5/2000 | Sampson et al. |
| 6,073,242 A | 6/2000 | Hardy et al. |
| 6,081,829 A | 6/2000 | Sidana |
| 6,083,276 A | 7/2000 | Davidson et al. |
| 6,088,679 A | 7/2000 | Barkley |
| 6,092,083 A | 7/2000 | Brodersen et al. |
| 6,098,173 A | 8/2000 | Elgressy et al. |
| 6,105,027 A | 8/2000 | Schneider et al. |
| 6,108,687 A | 8/2000 | Craig |
| 6,112,192 A | 8/2000 | Capek |
| 6,122,647 A | 9/2000 | Horowitz et al. |
| 6,128,663 A | 10/2000 | Thomas |
| 6,133,915 A | 10/2000 | Arcuri et al. |
| 6,141,010 A | 10/2000 | Hoyle |
| 6,141,686 A | 10/2000 | Jackowski et al. |
| 6,148,333 A | 11/2000 | Guedalia et al. |
| 6,154,844 A | 11/2000 | Touboul et al. |
| 6,157,924 A | 12/2000 | Austin |
| 6,158,010 A | 12/2000 | Moriconi et al. |
| 6,161,139 A | 12/2000 | Win et al. |
| 6,167,407 A | 12/2000 | Nachenberg et al. |
| 6,167,445 A | 12/2000 | Gai et al. |
| 6,167,448 A | 12/2000 | Hemphill et al. |
| 6,169,794 B1 | 1/2001 | Oshimi et al. |
| 6,170,009 B1 | 1/2001 | Mandal et al. |
| 6,178,172 B1 | 1/2001 | Rochberger |
| 6,182,142 B1 | 1/2001 | Win et al. |
| 6,182,226 B1 | 1/2001 | Reid et al. |
| 6,182,277 B1 | 1/2001 | Degroot et al. |
| 6,185,587 B1 | 2/2001 | Bernardo et al. |
| 6,188,399 B1 | 2/2001 | Voas et al. |
| 6,195,696 B1 | 2/2001 | Baber et al. |
| 6,202,066 B1 | 3/2001 | Barkley et al. |
| 6,202,157 B1 | 3/2001 | Brownlie et al. |
| 6,202,207 B1 | 3/2001 | Donohue |
| 6,205,466 B1 | 3/2001 | Karp et al. |
| 6,209,101 B1 | 3/2001 | Mitchem et al. |
| 6,216,134 B1 | 4/2001 | Heckerman et al. |
| 6,216,231 B1 | 4/2001 | Stubblebine |
| 6,226,745 B1 | 5/2001 | Wiederhold |
| 6,233,576 B1 | 5/2001 | Lewis |
| 6,236,991 B1 | 5/2001 | Frauenhofer et al. |
| 6,241,608 B1 | 6/2001 | Torango |
| 6,243,747 B1 | 6/2001 | Lewis et al. |
| 6,253,321 B1 | 6/2001 | Nikander et al. |
| 6,256,741 B1 | 7/2001 | Stubblebine |
| 6,260,050 B1 | 7/2001 | Yost et al. |
| 6,269,393 B1 | 7/2001 | Yost et al. |
| 6,269,456 B1 | 7/2001 | Hodges et al. |
| 6,275,941 B1 | 8/2001 | Saito et al. |
| 6,278,452 B1 | 8/2001 | Huberman et al. |
| 6,285,366 B1 | 9/2001 | Ng et al. |
| 6,285,983 B1 | 9/2001 | Jenkins |
| 6,285,985 B1 | 9/2001 | Horstmann |
| 6,292,827 B1 * | 9/2001 | Raz ............................ 709/217 |
| 6,292,900 B1 | 9/2001 | Ngo et al. |
| 6,295,607 B1 | 9/2001 | Johnson |
| 6,301,613 B1 | 10/2001 | Ahlstrom et al. |
| 6,304,881 B1 | 10/2001 | Halim et al. |
| 6,308,163 B1 | 10/2001 | Du et al. |
| 6,308,173 B1 | 10/2001 | Glasser et al. |
| 6,317,868 B1 | 11/2001 | Grimm et al. |
| 6,321,336 B1 | 11/2001 | Applegate et al. |
| 6,327,594 B1 | 12/2001 | Van Huben et al. |
| 6,327,618 B1 | 12/2001 | Ahlstrom et al. |
| 6,327,628 B1 | 12/2001 | Anuff |
| 6,336,073 B1 | 1/2002 | Ihara et al. |
| 6,339,423 B1 | 1/2002 | Sampson et al. |
| 6,339,826 B2 | 1/2002 | Hayes, Jr. et al. |
| 6,341,352 B1 | 1/2002 | Child et al. |
| 6,349,297 B1 | 2/2002 | Shaw et al. |
| 6,353,886 B1 | 3/2002 | Howard et al. |
| 6,357,010 B1 | 3/2002 | Viets |
| 6,360,230 B1 * | 3/2002 | Chan et al. ................ 707/103 R |
| 6,360,363 B1 | 3/2002 | Moser et al. |
| 6,366,915 B1 | 4/2002 | Rubert et al. |
| 6,377,973 B2 | 4/2002 | Gideon |
| 6,381,579 B1 | 4/2002 | Gervais et al. |
| 6,385,627 B1 | 5/2002 | Cragun |
| 6,393,474 B1 | 5/2002 | Eichert et al. |
| 6,397,222 B1 | 5/2002 | Zellweger |
| 6,397,231 B1 | 5/2002 | Salisbury et al. |
| 6,412,070 B1 | 6/2002 | Van Dyke et al. |
| 6,412,077 B1 | 6/2002 | Roden et al. |
| 6,418,448 B1 | 7/2002 | Sarkar |
| 6,430,556 B1 | 8/2002 | Goldberg et al. |
| 6,434,607 B1 | 8/2002 | Haverstock et al. |
| 6,438,563 B1 | 8/2002 | Kawagoe |
| 6,449,638 B1 | 9/2002 | Wecker et al. |
| 6,457,007 B1 | 9/2002 | Kikuchi et al. |
| 6,460,084 B1 | 10/2002 | Van Horne et al. |
| 6,460,141 B1 | 10/2002 | Olden |
| 6,463,440 B1 | 10/2002 | Hind et al. |
| 6,466,239 B2 | 10/2002 | Ishikawa |
| 6,466,932 B1 | 10/2002 | Dennis et al. |
| 6,473,791 B1 | 10/2002 | Al-Ghosein et al. |
| 6,477,543 B1 | 11/2002 | Huang et al. |
| 6,477,575 B1 | 11/2002 | Koeppel et al. |
| 6,484,177 B1 | 11/2002 | Van Huben et al. |
| 6,484,261 B1 | 11/2002 | Wiegel |
| 6,487,594 B1 | 11/2002 | Bahlmann |
| 6,510,513 B1 | 1/2003 | Danieli |
| 6,516,337 B1 | 2/2003 | Tripp et al. |
| 6,519,647 B1 | 2/2003 | Howard et al. |
| 6,530,024 B1 | 3/2003 | Proctor |
| 6,539,375 B2 | 3/2003 | Kawasaki |
| 6,542,993 B1 | 4/2003 | Erfani |

| | | | | | | |
|---|---|---|---|---|---|---|
| 6,571,247 B1 | 5/2003 | Danno et al. | | 7,043,685 B2 | 5/2006 | Azuma |
| 6,574,736 B1 | 6/2003 | Andrews | | 7,047,522 B1 | 5/2006 | Dixon et al. |
| 6,581,054 B1 | 6/2003 | Bogrett | | 7,051,016 B2 | 5/2006 | Winkler |
| 6,581,071 B1 | 6/2003 | Gustman et al. | | 7,051,071 B2 | 5/2006 | Stewart |
| 6,584,454 B1 | 6/2003 | Hummel, Jr. et al. | | 7,051,316 B2 | 5/2006 | Charisius et al. |
| 6,587,849 B1 | 7/2003 | Mason et al. | | 7,054,910 B1 | 5/2006 | Nordin et al. |
| 6,587,876 B1 | 7/2003 | Mahon et al. | | 7,062,490 B2 | 6/2006 | Adya et al. |
| 6,615,218 B2 | 9/2003 | Mandal et al. | | 7,062,511 B1 | 6/2006 | Poulsen |
| 6,618,806 B1 | 9/2003 | Brown et al. | | 7,065,771 B1 | 6/2006 | Prabhu et al. |
| 6,633,538 B1 | 10/2003 | Tanaka et al. | | 7,076,652 B2 | 7/2006 | Ginter et al. |
| 6,654,747 B1 | 11/2003 | Van Huben et al. | | 7,080,000 B1 | 7/2006 | Cambridge |
| 6,665,677 B1 | 12/2003 | Wotring et al. | | 7,085,755 B2 | 8/2006 | Bluhm et al. |
| 6,668,354 B1 | 12/2003 | Chen et al. | | 7,085,994 B2 | 8/2006 | Gvily |
| 6,671,689 B2 | 12/2003 | Papierniak | | 7,089,584 B1 | 8/2006 | Sharma |
| 6,684,369 B1 | 1/2004 | Bernardo et al. | | 7,093,200 B2 | 8/2006 | Schreiber et al. |
| 6,694,306 B1 | 2/2004 | Nishizawa | | 7,093,261 B1 | 8/2006 | Harper et al. |
| 6,697,805 B1 | 2/2004 | Choquier et al. | | 7,093,283 B1 | 8/2006 | Chen et al. |
| 6,715,077 B1 | 3/2004 | Vasudevan et al. | | 7,096,224 B2 | 8/2006 | Murthy et al. |
| 6,721,888 B1 | 4/2004 | Liu et al. | | 7,111,321 B1 | 9/2006 | Watts et al. |
| 6,728,713 B1 | 4/2004 | Beach et al. | | 7,124,192 B2 | 10/2006 | High et al. |
| 6,732,144 B1 | 5/2004 | Kizu et al. | | 7,124,413 B1 | 10/2006 | Klemm et al. |
| 6,732,331 B1 | 5/2004 | Alexander | | 7,134,076 B2 * | 11/2006 | Bahrs et al. .................... 715/239 |
| 6,735,586 B2 | 5/2004 | Timmons | | 7,146,564 B2 | 12/2006 | Kim et al. |
| 6,735,624 B1 | 5/2004 | Rubin et al. | | 7,174,563 B1 | 2/2007 | Brownlie et al. |
| 6,735,701 B1 | 5/2004 | Jacobson | | 7,185,192 B1 | 2/2007 | Kahn |
| 6,738,789 B2 | 5/2004 | Multer | | 7,219,140 B2 | 5/2007 | Marl et al. |
| 6,745,207 B2 | 6/2004 | Reuter et al. | | 7,269,664 B2 | 9/2007 | Hutsch et al. |
| 6,751,657 B1 | 6/2004 | Zothner | | 7,272,625 B1 | 9/2007 | Hannel et al. |
| 6,751,659 B1 | 6/2004 | Fenger et al. | | 7,293,286 B2 * | 11/2007 | Owen et al. ..................... 726/17 |
| 6,754,672 B1 | 6/2004 | McLauchlin | | 7,383,320 B1 * | 6/2008 | Silberstein et al. ........... 709/219 |
| 6,757,698 B2 | 6/2004 | McBride et al. | | 7,454,435 B2 | 11/2008 | Friedman et al. |
| 6,757,822 B1 | 6/2004 | Feiertag et al. | | 7,539,688 B2 | 5/2009 | Sezgin et al. |
| 6,769,095 B1 | 7/2004 | Brassard et al. | | 7,546,463 B2 | 6/2009 | Karabulut |
| 6,769,118 B2 | 7/2004 | Garrison et al. | | 7,558,790 B1 * | 7/2009 | Miller et al. ..................... 707/4 |
| 6,772,157 B2 | 8/2004 | Barnett et al. | | 2001/0009016 A1 | 7/2001 | Hofmann et al. |
| 6,772,332 B1 | 8/2004 | Boebert et al. | | 2001/0032128 A1 | 10/2001 | Kepecs |
| 6,779,002 B1 | 8/2004 | Mwaura | | 2001/0034771 A1 | 10/2001 | Hutsch et al. |
| 6,789,202 B1 | 9/2004 | Ko et al. | | 2001/0034774 A1 | 10/2001 | Watanabe et al. |
| 6,792,537 B1 | 9/2004 | Liu et al. | | 2001/0039586 A1 | 11/2001 | Primak et al. |
| 6,832,313 B1 | 12/2004 | Parker | | 2001/0044810 A1 | 11/2001 | Timmons |
| 6,834,284 B2 | 12/2004 | Acker et al. | | 2001/0047485 A1 | 11/2001 | Brown et al. |
| 6,853,997 B2 | 2/2005 | Wotring et al. | | 2002/0005867 A1 | 1/2002 | Gvily |
| 6,854,035 B2 | 2/2005 | Dunham et al. | | 2002/0010741 A1 | 1/2002 | Stewart |
| 6,856,999 B2 | 2/2005 | Flanagin et al. | | 2002/0019827 A1 | 2/2002 | Shiman et al. |
| 6,857,012 B2 | 2/2005 | Sim et al. | | 2002/0023122 A1 | 2/2002 | Polizzi et al. |
| 6,865,549 B1 | 3/2005 | Connor | | 2002/0029296 A1 | 3/2002 | Anuff et al. |
| 6,873,988 B2 | 3/2005 | Herrmann et al. | | 2002/0046099 A1 | 4/2002 | Frengut et al. |
| 6,880,005 B1 | 4/2005 | Bell et al. | | 2002/0059394 A1 | 5/2002 | Sanders |
| 6,886,100 B2 | 4/2005 | Harrah et al. | | 2002/0062451 A1 | 5/2002 | Scheidt et al. |
| 6,889,222 B1 | 5/2005 | Zhao | | 2002/0067370 A1 | 6/2002 | Forney et al. |
| 6,901,403 B1 | 5/2005 | Bata et al. | | 2002/0069261 A1 | 6/2002 | Bellare et al. |
| 6,904,454 B2 | 6/2005 | Stickler | | 2002/0087571 A1 | 7/2002 | Stapel et al. |
| 6,912,538 B2 | 6/2005 | Stapel et al. | | 2002/0091679 A1 * | 7/2002 | Wright .............................. 707/3 |
| 6,917,975 B2 | 7/2005 | Griffin et al. | | 2002/0103818 A1 | 8/2002 | Amberden |
| 6,918,088 B2 | 7/2005 | Clark et al. | | 2002/0104071 A1 | 8/2002 | Charisius et al. |
| 6,920,457 B2 | 7/2005 | Pressmar | | 2002/0107913 A1 | 8/2002 | Rivera et al. |
| 6,922,695 B2 | 7/2005 | Skufca | | 2002/0107920 A1 | 8/2002 | Hotti |
| 6,925,487 B2 | 8/2005 | Kim | | 2002/0111998 A1 | 8/2002 | Kim |
| 6,931,549 B1 | 8/2005 | Ananda | | 2002/0112171 A1 | 8/2002 | Ginter et al. |
| 6,934,532 B2 | 8/2005 | Coppinger et al. | | 2002/0120685 A1 | 8/2002 | Srivastava et al. |
| 6,934,934 B1 | 8/2005 | Osborne | | 2002/0124053 A1 | 9/2002 | Adams et al. |
| 6,947,989 B2 | 9/2005 | Gulotta et al. | | 2002/0135617 A1 | 9/2002 | Samid |
| 6,950,825 B2 | 9/2005 | Chang et al. | | 2002/0143819 A1 | 10/2002 | Han et al. |
| 6,957,261 B2 | 10/2005 | Lortz | | 2002/0147645 A1 | 10/2002 | Alao et al. |
| 6,961,897 B1 | 11/2005 | Peel et al. | | 2002/0147696 A1 | 10/2002 | Acker |
| 6,965,999 B2 | 11/2005 | Fox et al. | | 2002/0147801 A1 | 10/2002 | Gullotta et al. |
| 6,970,445 B2 | 11/2005 | O'Neill et al. | | 2002/0152210 A1 * | 10/2002 | Johnson et al. ..................... 707/9 |
| 6,970,840 B1 | 11/2005 | Yu et al. | | 2002/0152267 A1 | 10/2002 | Lennon |
| 6,970,876 B2 | 11/2005 | Hotti et al. | | 2002/0152279 A1 | 10/2002 | Sollenberger et al. |
| 6,978,379 B1 | 12/2005 | Goh et al. | | 2002/0161903 A1 | 10/2002 | Besaw |
| 6,985,915 B2 | 1/2006 | Somalwar et al. | | 2002/0169893 A1 | 11/2002 | Chen et al. |
| 6,987,580 B2 | 1/2006 | Watanabe et al. | | 2002/0169975 A1 | 11/2002 | Good |
| 6,988,138 B1 | 1/2006 | Alcorn et al. | | 2002/0173971 A1 | 11/2002 | Stirpe et al. |
| 7,003,578 B2 | 2/2006 | Kanada et al. | | 2002/0178119 A1 | 11/2002 | Griffin et al. |
| 7,013,485 B2 | 3/2006 | Brown et al. | | 2002/0188869 A1 | 12/2002 | Patrick |
| 7,035,857 B2 | 4/2006 | Reeves et al. | | 2002/0194267 A1 | 12/2002 | Flesner et al. |
| 7,035,879 B2 | 4/2006 | Shi et al. | | 2003/0014442 A1 | 1/2003 | Shiigi et al. |
| 7,035,944 B2 | 4/2006 | Fletcher et al. | | 2003/0018669 A1 * | 1/2003 | Kraft ............................ 707/530 |
| 7,043,472 B2 | 5/2006 | Aridor et al. | | 2003/0032409 A1 | 2/2003 | Hutcheson et al. |

| | | |
|---|---|---|
| 2003/0033315 A1 | 2/2003 | Winkler |
| 2003/0046576 A1 | 3/2003 | High, Jr. et al. |
| 2003/0065721 A1 | 4/2003 | Roskind |
| 2003/0069874 A1 | 4/2003 | Hertzog |
| 2003/0078959 A1 | 4/2003 | Yeung et al. |
| 2003/0078972 A1 | 4/2003 | Tapissier et al. |
| 2003/0088617 A1 | 5/2003 | Clark et al. |
| 2003/0110448 A1 | 6/2003 | Haut et al. |
| 2003/0115484 A1 | 6/2003 | Moriconi et al. |
| 2003/0120686 A1 | 6/2003 | Kim et al. |
| 2003/0126236 A1 | 7/2003 | Marl et al. |
| 2003/0126464 A1 | 7/2003 | McDaniel et al. |
| 2003/0126558 A1 | 7/2003 | Griffin |
| 2003/0131113 A1 | 7/2003 | Reeves et al. |
| 2003/0135490 A1 | 7/2003 | Barrett et al. |
| 2003/0140308 A1 | 7/2003 | Murthy et al. |
| 2003/0145275 A1 | 7/2003 | Qian et al. |
| 2003/0146937 A1 | 8/2003 | Lee |
| 2003/0167315 A1 | 9/2003 | Chowdry et al. |
| 2003/0167455 A1 | 9/2003 | Iborra et al. |
| 2003/0182308 A1* | 9/2003 | Ernst et al. ............... 707/103 Z |
| 2003/0182577 A1 | 9/2003 | Mocek |
| 2003/0187956 A1 | 10/2003 | Belt et al. |
| 2003/0188085 A1 | 10/2003 | Arakawa et al. |
| 2003/0200350 A1 | 10/2003 | Kumar et al. |
| 2003/0204481 A1 | 10/2003 | Lau |
| 2003/0212766 A1 | 11/2003 | Giles et al. |
| 2003/0216938 A1 | 11/2003 | Shour |
| 2003/0220913 A1 | 11/2003 | Doganata et al. |
| 2003/0220963 A1 | 11/2003 | Golovinsky et al. |
| 2003/0229501 A1 | 12/2003 | Copeland et al. |
| 2003/0229623 A1 | 12/2003 | Chang et al. |
| 2004/0003071 A1 | 1/2004 | Mathew et al. |
| 2004/0010719 A1 | 1/2004 | Daenen |
| 2004/0019650 A1 | 1/2004 | Auvenshine |
| 2004/0024812 A1 | 2/2004 | Park et al. |
| 2004/0030744 A1 | 2/2004 | Rubin et al. |
| 2004/0030795 A1 | 2/2004 | Hesmer et al. |
| 2004/0064633 A1 | 4/2004 | Oota |
| 2004/0078371 A1 | 4/2004 | Worrall et al. |
| 2004/0088306 A1* | 5/2004 | Murthy et al. ............... 707/100 |
| 2004/0093344 A1 | 5/2004 | Berger |
| 2004/0098467 A1 | 5/2004 | Dewey et al. |
| 2004/0098470 A1 | 5/2004 | Kurihara |
| 2004/0098606 A1 | 5/2004 | Tan et al. |
| 2004/0107360 A1 | 6/2004 | Herrmann et al. |
| 2004/0125144 A1 | 7/2004 | Yoon |
| 2004/0162733 A1 | 8/2004 | Griffin |
| 2004/0162905 A1 | 8/2004 | Griffin |
| 2004/0162906 A1 | 8/2004 | Griffin |
| 2004/0167880 A1 | 8/2004 | Smith |
| 2004/0167899 A1 | 8/2004 | Patadia et al. |
| 2004/0167920 A1* | 8/2004 | Owen et al. ................. 707/102 |
| 2004/0168084 A1* | 8/2004 | Owen et al. ................. 713/201 |
| 2004/0205473 A1 | 10/2004 | Fisher et al. |
| 2004/0205557 A1 | 10/2004 | Bahrs et al. |
| 2004/0215635 A1 | 10/2004 | Chang et al. |
| 2004/0215650 A1 | 10/2004 | Shaji et al. |
| 2004/0230546 A1 | 11/2004 | Rogers |
| 2004/0236760 A1 | 11/2004 | Arkeketa et al. |
| 2004/0243824 A1 | 12/2004 | Jones |
| 2005/0021502 A1 | 1/2005 | Chen et al. |
| 2005/0021656 A1 | 1/2005 | Callegari |
| 2005/0050184 A1 | 3/2005 | Boden et al. |
| 2005/0060324 A1 | 3/2005 | Johnson et al. |
| 2005/0076030 A1 | 4/2005 | Hada et al. |
| 2005/0086206 A1 | 4/2005 | Balasubramanian et al. |
| 2005/0086469 A1 | 4/2005 | Dunagan et al. |
| 2005/0097008 A1 | 5/2005 | Ehring et al. |
| 2005/0102324 A1* | 5/2005 | Spring et al. ............... 707/104.1 |
| 2005/0138160 A1* | 6/2005 | Klein et al. ............... 709/223 |
| 2005/0188349 A1* | 8/2005 | Bent et al. ............... 717/106 |
| 2005/0198617 A1 | 9/2005 | Kim et al. |
| 2005/0228827 A1* | 10/2005 | McCauley et al. ......... 707/104.1 |
| 2005/0256894 A1 | 11/2005 | Talanis et al. |
| 2005/0256907 A1* | 11/2005 | Novik et al. ............... 707/200 |
| 2005/0257267 A1 | 11/2005 | Williams et al. |
| 2006/0005150 A1 | 1/2006 | Pankovcin |
| 2006/0031246 A1* | 2/2006 | Grayson ................. 707/102 |
| 2006/0031811 A1* | 2/2006 | Ernst et al. ............... 717/100 |
| 2006/0041661 A1* | 2/2006 | Erikson et al. ............... 709/225 |
| 2006/0059107 A1 | 3/2006 | Elmore et al. |
| 2006/0085412 A1 | 4/2006 | Johnson et al. |
| 2006/0122882 A1 | 6/2006 | Brown et al. |
| 2006/0149567 A1 | 7/2006 | Muller et al. |
| 2006/0167858 A1 | 7/2006 | Dennis et al. |
| 2006/0195459 A1* | 8/2006 | Nori et al. ............... 707/100 |
| 2006/0195460 A1* | 8/2006 | Nori et al. ............... 707/100 |
| 2006/0218394 A1 | 9/2006 | Yang |
| 2006/0225123 A1 | 10/2006 | Childress et al. |
| 2006/0277594 A1 | 12/2006 | Chiavegatto et al. |
| 2007/0016595 A1* | 1/2007 | Mullins ................. 707/100 |
| 2007/0083484 A1 | 4/2007 | McVeigh et al. |
| 2007/0179828 A1* | 8/2007 | Elkin et al. ............... 705/8 |
| 2007/0294743 A1 | 12/2007 | Kaler et al. |
| 2010/0169380 A1* | 7/2010 | Miller et al. ............... 707/791 |

FOREIGN PATENT DOCUMENTS

| | | |
|---|---|---|
| EP | 1 256 889 | 11/2002 |
| WO | 00/38078 | 6/2000 |
| WO | 01/14962 | 3/2001 |
| WO | 01/67285 | 9/2001 |
| WO | 01/77823 | 10/2001 |
| WO | 02/063496 | 8/2002 |
| WO | 02/075597 | 9/2002 |

OTHER PUBLICATIONS

Ahn, Gail-Joon, et al. Role-Based Authorization Constraints Specification Using Object Constraint Language, IEEE, pp. 157-162 (2001).

Ayers, Danny et al., "Professional Java Server Programming," Wrox Press, Ltd., Birmingham, UK, Dec. 1999, pp. 515-545.

Baltimore SelectAccess™ next generation authorization management, www.baltimore.com, 8 pages (2001).

Barrett, Alexandra, "Trying Out Transactions", SunExpert Magazine, Jan. 1999, pp. 57-59.

BEA WebLogic Portal-Development Guide, Release 7.0, Service Pack 1, Document Date Dec. 2002, 626 pages.

BEA WebLogic Server™, "Assembling and Configuring Web Applications," BEA Systems Release 7.0, Revised Aug. 20, 2002, 165 pages.

BEA WebLogic Server™, "Developing Security Providers for WebLogic Server," BEA Systems Release 7.0, Revised Aug. 30, 2002, 315 pages.

BEA WebLogic Server™, "Introduction to WebLogic Security," BEA Systems Release 7.0, Document Date Jun. 2002, Revised Jun. 28, 2002, 22 pages.

BEA Systems, "WebLogic Server™ 6.1 has been released," The ServerSide.com, Sep. 13, 2001, 6 pages.

Bertino, Elisa, et al., "TRBAC: A Temporal Role-Based Access Control Model," ACM Transactions on Information and System Security (TISSEC), vol. 4, Issue 3, pp. 191-223 (Aug. 2001).

Browne, Shirley V., et al., Reuse Library Interoperability and the World Wide Web, ACM, pp. 182-189 (1997).

Browne, Shirley, et al., "Technologies for Repository Interoperation and Access Control," ACM, pp. 40-48 (1995).

Browne, Shirley, et al. "Location-Independent Naming for Virtual Distributed Software Repositories,"ACM Symposium on Software Reusability, Seattle, WA, US, vol. 20, Issue SI, pp. 179-185 (Aug. 1995).

Candan, K.S., et al. "Enabling Dynamic Content Caching for Database-Driven Websites," Proceedings of the 2001 ACM SIGMOD International Conference on Management of Data, Santa Barbara, CA, US, pp. 532-543 (2001).

Catley, Christina, et al. "Design of a Health Care Architecture for Medical Data Interoperability and Application Integration," Proceedings of the Second Joint EMBS/BMES Conference, Houston, TX, US, Oct. 23-26, 2002, IEEE, vol. 3, pp. 1952-1953.

Cingil, Ibrahim, et al., "A Broader Approach to Personalization," Communications of the ACM, vol. 43, No. 6, pp. 136-141 (Aug. 2000).

Costello, S., "Baltimore to Release SelectAccess 5.0 with SAML," Apr. 24, 2002, www.infoworld.com/articles/hn/xml/02/02/24/020424hnsam1.html, printed Feb. 17, 2006.

Covington, Michael J., et al., "Securing Context-Aware Applications Using Environment Roles," ACM Workshop on Role Based Access Control, Proceedings of the Sixth ACM Symposium on Access Control Models and Technologies, pp. 10-20 (2001).

Faden, Glenn, "RBAC in UNIX Administration,"ACM Workshop on Role-Based Access Control, pp. 95-101 (1999).

First Data Chooses Baltimore SelectAccess to Secure Extranet Applications, Mar. 5, 2002, 2 pages.

Ford, Nigel, "Web Developer.com Guide to Building Intelligent Web Sites with JavaScript," Wiley Computer Publishing, NY, 1998, pp. 65-86, 96-98, 245-250 and 324-327.

Freudenthal, Eric, et al., "dRBAC: Distributed Role-Based Access Control for Dynamic Coalition Environments," Proceedings of the 22nd International Conference on Distributed Computing Systems (ICDCS '02) IEEE 2002, 10 pages.

Georgiadis, Christos K., et al., "Flexible Team-Based Access Control Using Contexts," ACM Workshop on Role Based Access Control, Proceedings of the Sixth ACM Symposium on Access Control Methods and Technologies, pp. 21-27 (2001).

Goh, Cheh, et al., "Towards a more Complete Model of Role," Symposium on Access Control Models and Technologies, Proceedings of the Third ACM Workshop on Role-Based Access Control, pp. 55-61 (1998).

Gustafsson, Mats, et al., "Using NFS to Implement Role-Based Access Control," IEEE, pp. 299-304 (1997).

Hayton, R.J., et al., "Access Control in an Open Distributed Environment," 12 pages (1998).

Howes, T., "The String Representation of LDAP Search Filters," © The Internet Society, RFC 2254, 8 pages (Dec. 1997).

Hunter, Jason, "Java Servlet Programming," second edition, O'Reilly, Apr. 11, 2001, 20 pages.

http://java.sun.com/products/ejb/(last visit Dec. 7, 2004), 2 pages.

http://javaworld.com/jw-12-2002/jw-1207-yesnoejb_p.html (last visit Dec. 7, 2004), 2 pages.

http://portal.acm.org/citation.cfm?id=1011436, 1 page, last visited: Oct. 24, 2007.

Joshi, J., et al., "Security Models for Web-Based Applications," Communications of the ACM, vol. 44, No. 2, pp. 38-44 (2001).

Lee, Amy J., et al., "Keeping Virtual Information Resources up and Running," IBM Press, pp. 1-14 (Nov. 1997).

Microsoft Computer Dictionary, 4th Edition, Microsoft Press, Redmond, WA, p. 489 (1999).

Microsoft Computer Dictionary, 5th Edition, Microsoft Press, Redmond, WA, pp. 115, 176 and 542 (2002).

Moore, Bill et al., "Migrating Weblogic Applications to WebSphere Advanced Edition", IBM Redbooks, pp. 1, 3-4, 109-111 and 181-195 (Jan. 2001).

Microsoft Windows ("Windows Explorer") copyright 1981-2001, 3 pages.

Na, Sang Yeob, et al., "Role Delegation in Role-Based Access Control," ACM Workshop on Role-Based Access Control, RBAC, Berlin, Germany, pp. 39-44 (2000).

Nuescheler, David, et al., "Java Content Repository-JSR-170," version 0.1, Apr. 24, 2002, version 0.2 May 10, 2004, version 0.3 May 17, 2002, version 0.4 Jul. 17, 2002, version 0.5 Sep. 16, 2002, and version 0.6 Nov. 26, 2002, pp. 1-99.

Oh, Sejong, et al., "Enterprise Model as a Basis of Administration on Role-Based Access Control," IEEE, pp. 150-158 (2001).

Okamoto, Eiji, "Proposal for Integrated Security Systems," IEEE Computer Society Press, pp. 354-358 (Jun. 1992).

Park, Joon S., "Role-Based Access Control on the Web," ACM Transactions on Information and System Security, vol. 4, No. 1, pp. 37-71(Feb. 2001).

Parker, Elisabeth, "The Complete Idiot's Guide® to Microsoft® FrontPage 2000", QUE®, Indianapolis, IN, pp. 7 and 52 (1999).

Povey, Dean, "Optimistic Security: A New Access Control Paradigm," 6 pages.

Porwal, Priyank, "Automating Optimistic Access Control Systems," 10 pages.

Rossi, Gustavo, et al., "Designing Personalized Web Applications," ACM, WWW 10, Hong Kong, May 1-5, 2001, pp. 275-284.

Sandhu, Ravi S., et al., "Role-Based Access Control Models," IEEE Computer, vol. 29, No. 2, pp. 38-47 (1996).

Sandhu, Ravi S., et al., "The ARBAC97 Model for Role-Based Administration of Roles," ACM Transactions on Information and System Security vol. 2, No. 1, pp. 105-135 (Feb. 1999).

Sandhu, Ravi S., et al., "The RRA97 Model for Role-Based Administration of Role Hierarchies," ACSAC, pp. 39-49 (1998).

Shim, Won Bo, et al. "Implementing Web Access Control System for the Multiple Web Servers in the Same Domain Using RBAC Concept," IEEE, pp. 768-773 (2001).

Stephanidis, Constantine, et al., "Decision Making in Intelligent User Interfaces," IUI '97, Orlando, FL, US, ACM, pp. 195-202 (1997).

Stiemerling, Oliver, et al., "How to Make Software Softer—Designing Tailorable Applications," DIS '97, Amsterdam, The Netherlands, ACM, pp. 365-376 (1997).

Sunsted, Todd, "JNDI Overview, Part 1: An Introduction to Naming Services", JavaWorld, Jan. 2000, pp. 1-6, (downloaded from www.javaworld.com/javaworld/jw-01-2000/jw-01-howto_p.html).

Supplementary European Search Report for EP 02 7238740.0 dated Jun. 7, 2006, 3 pages.

Tanyi, Emmanuel, "Easy XML," www.winsite.com, pp. 1-6 (Mar. 2000).

Tzelepi, Sofia K., et al., "A Flexible Content and Context-Based Access Control Model for Multimedia Medical Image Database Systems," International Multimedia Conference, Proceedings of the 2001 Workshop on Multimedia and Security, Oct. 5, 2001, pp. 52-55.

Visveswaran, Siva, "Dive into Connection Pooling with J2EE," reprinted from JavaWorld, 7 pages (Oct. 2000).

Yao, Walt, et al., "A Model of OASIS Role-Based Access Control and its Support for Active Security," ACM Workshop on Role Based Access Control, Proceedings of the Sixth ACM Symposium on Access Control Methods and Technologies, pp. 171-181 (2001).

Zhang, Zheng, et al., "Designing a Robust Namespace for Distributed File Services," Reliable Distributed System, Proceedings 20th IEEE Symposium on Oct. 28-31, 2001, pp. 162-171.

An Introduction to BEA WebLogic® Server Security: The New Security Architecture of BEA WebLogic Server™ 7.0, BEA White Paper, May 1, 2002, 20 pages.

"Combined-User Interface for Computers, Television, Video Recorders, and Telephone, etc . . . ," IBM Technical Disclosure Bulletin, US, pp. 116-118 (Aug. 1990).

"Guide to Using the BEA E-Business Control Center," BEA Web Logic Portal, Version 4.0 (Oct. 2001) 356 pages.

"Method and System for Visually Constructing Document Type Definitions and Related Artifacts Using a Reusable Object Model," IBM Technical Disclosures Bulletin, May 31, 2001, 3 pages.

Adomavicius, Gediminas, et al., "User Profiling in Personalization Applications Through Rule Discovery and Validation," KDD 99, San Diego, CA, US, ACM, pp. 377-381(1999).

International Search Report and Written Opinion for PCT/US04/04079 dated Aug. 24, 2004, 6 pages.

International Search Report for PCT/US02/34006, dated Jan. 13, 2003, 3 pages.

International Search Report for PCT/US02/34007, dated Jan. 21, 2003, 3 pages.

International Search Report for PCT/US02/34008, dated Dec. 31, 2002, 5 pages.

International Search Report for PCT/US02/34048, dated Dec. 23, 2002, 2 pages.

International Search Report for PCT/US02/34088, dated Mar. 7, 2003, 3 pages.

International Search Report for PCT/US02/34089, dated Feb. 19, 2003, 4 pages.

International Search Report for PCT/US02/34308, dated Mar. 5, 2003, 4 pages.

International Search Report for PCT/US02/34309, dated Feb. 14, 2003, 4 pages.

International Search Report and Written Opinion for PCT/US04/04691 dated Sep. 24, 2004, 6 pages.

International Search Report for PCT/US04/04078, dated Dec. 15, 2005, 2 pages.

International Search Report for PCT/US04/04140, dated Dec. 27, 2005, 2 pages.

IPER for PCT/US02/11969, dated Dec. 1, 2004, 2 pages.

Moran et al., "Multimodal User Interfaces in the Open Agent Architecture", ACM 0-89791-839-8/96/01, IUI, Orlando, Florida USA (1997) pp. 61-68.

Rouff, "Formal Specification of User Interfaces", Sighic Bulletin, vol. 28, No. 3 (Jul. 1996) pp. 27-33.

USDatacenters . . . eBusiness, Business Wire, Apr. 4, 2001, p. 2079.

Supplementary European Search Report for EP 02 773915.0 dated Oct. 12, 2006 (3 pages).

Supplementary European Search Report for EP 02 7238740.0 dated Jun. 7, 2006 (3 pages).

Kistler, Thomas, et al., "WebL—a Programming Language for the Web," Computer Networks and ISDN Systems, North Holland Publishing, Amsterdam, NL, vol. 30, No. 1-7, pp. 259-270 (Apr. 1998).

Levy, Michael R., "Web Programming in Guide," Software Practice & Experience, Wiley & Sons, Bognor Regis, GB, vol. 28, No. 15, Dec. 25, 1998, pp. 1581-1603.

Atkins, David L., et al., "MAWL: A Domain Specific Language for Form-Based Services," IEEE Transactions on Software Engineering, IEEE Service Center, Los Alamitos, CA, US, vol. 25, No. 3, pp. 334-346 (May 1999).

Symborski, Carl W., "Updating Software and Configuration Data in a Distributed Communications Network," IEEE Computer Networking Symposium, pp. 331-338 (1988).

Supplementary European Search Report for EP 01 97 5484 dated Dec. 19, 2006 (2 pages).

* cited by examiner

SYSTEM AND METHOD FOR PROVIDING LINK PROPERTY TYPES FOR CONTENT MANAGEMENT

CLAIM OF PRIORITY

This application claims the benefit of U.S. Provisional Patent Application 60/720,860 entitled IMPROVED CONTENT MANAGEMENT, by Ryan McVeigh et al., filed Sep. 26, 2005, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States Patents and Patent Applications, including the present application, are related to each other. Each of the other patents/applications are incorporated by reference herein in its entirety:

U.S. patent application Ser. No. 11/438,202 entitled SYSTEM AND METHOD FOR TYPE INHERITANCE FOR CONTENT MANAGEMENT, by Ryan McVeigh et al., filed on May 22, 2006;

U.S. patent application Ser. No. 11/438,593 entitled SYSTEM AND METHOD FOR PROVIDING NESTED TYPES FOR CONTENT MANAGEMENT, by Ryan McVeigh et al., filed on May 22, 2006; and

FIELD OF THE INVENTION

The current invention relates generally to managing content for use with portals and other content delivery mechanisms, and more particularly to mechanisms for type inheritance, abstract types, nested types and link property types in a content management system.

BACKGROUND

Content repositories manage and provide access to large data stores such as a newspaper archives, advertisements, inventories, image collections, etc. A content repository can be a key component of a web application such as a portal, which must quickly serve up different types of content in response to user interaction. However, difficulties can arise when trying to integrate more than one vendor's content repository. Each may have its own proprietary application program interface and content services (e.g., conventions for searching and manipulating content, versioning, workflows, and data formats). Furthermore, each time a repository is added to an application, the application software must be modified to accommodate these differences. What is needed is a coherent system and method for interacting with disparate repositories and for providing a uniform set of content services across all repositories, including those that lack such services.

DETAILED DESCRIPTION

Figure 1:
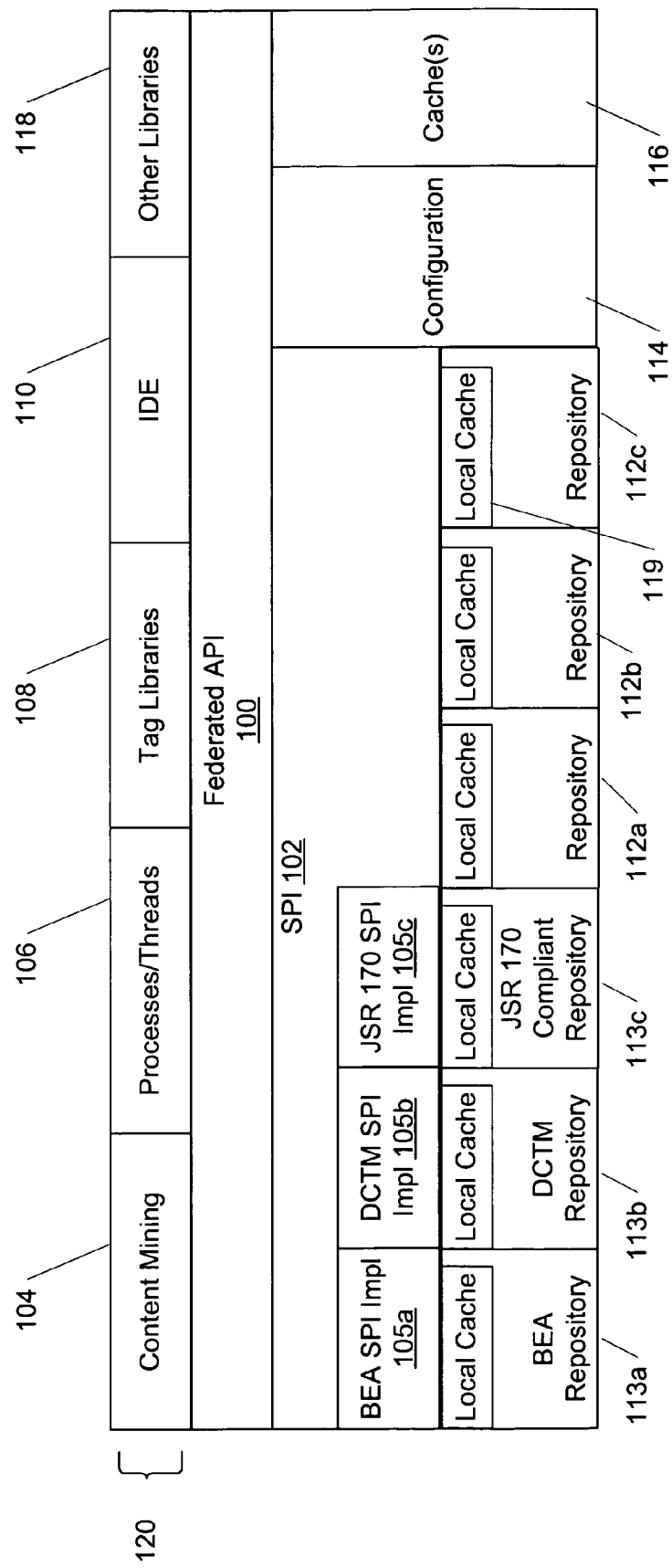
FIG. 1 is an exemplary illustration of functional system layers in various embodiments.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided mechanisms and methods for type inheritance in a content management system. These mechanisms and methods for type inheritance in a content management system can enable users to create types that extend from another type rather than create from scratch. The ability of embodiments to provide create types that extend from another type can enable a child type to automatically inherit one or more property definitions as defined in a parent type. For example, a user can create a type clothing with property definitions such as color, size, etc. The user can then create another type shirt, which "extends" the clothing type by adding a "sleeve length" property definition. Embodiments may further provide the ability to have abstract types, nested types and link property types.

In an embodiment and by way of example, a method for type inheritance in a content management system is provided. One method embodiment includes receiving a definition of a child data type, the child data type based upon a parent data type. At least one node in a virtual content repository (VCR) can be determined from the definition of a child data type. The node corresponds to the child data type and has at least one relationship with at least one other node. The at least one relationship can support extension of at least one property by the child data type from the parent data type. The at least one other node corresponds to the parent data type. The VCR models content in a plurality of content repositories. Content in the plurality of content repositories can then be managed based upon the VCR. In the event that either of the child data type or the parent data types are abstract data types, instantiation of any nodes based upon the abstract data type is blocked. The notion of a type being inherited can be made transparent to content nodes in embodiments.

In another aspect and according to embodiments, there are provided mechanisms and methods for providing nested variables in a content management system. These mechanisms and methods for providing nested variables in a content management system can enable users to model types that can be used within other type definitions. This differs from the Type Inheritance feature in that types that make use of the nested type feature do not extend their functionality but define a property definition having a value defined by all property definitions in the nested type. For example, user can create a type address with property definitions such as street, city, zip code, etc. The user can then create another type person that has property definitions such as "name" and home address and business address. The two address property definitions can be represented by the address type, each with the address type's property definitions.

In an embodiment and by way of example, a method for providing nested types in a content management system is provided. One method embodiment includes receiving definitions of a first data type and a second data type, the second data type based upon the first data type. At least one node is determined from the definition of the second data type in a virtual content repository (VCR) that models content in a plurality of content repositories. The at least one node corresponds to the second data type and has at least one relationship with at least one other node. The at least one other node corresponds to the first data type. The at least one relationship corresponds to defining a property of the first data type having a value defined by property definitions in the second data type. Content in the plurality of content repositories can then be managed based upon the VCR.

In a yet further aspect and according to embodiments, there are provided mechanisms and methods for providing linked property types in a content management system. These mechanisms and methods for providing linked property types in a content management system can enable users to specify a new property definition type, which refers to another node instance in the content management system. By specifying a link property definition type on a type, the user can then relate a node instance of the modeled type (link source) to any other node instance (link target) in the system. For example, a user can create a type Article with property definitions such as title, body and authorLink. The authorLink property definition can be a link type property definition. Then the user could define an Author content type. When an instance of an Article is created (anArticle), the authorLink property associated with anArticle could refer to a node instance of an Author.

In an embodiment and by way of example, a method for providing linked property types in a content management system is provided. One method embodiment includes receiving a link property definition type comprising a property definition type that refers to at least one node instance ("link target") in the content management system. At least one node ("link source") is determined from the definition of the link property definition type in a virtual content repository (VCR) that models content in a plurality of content repositories. The at least one node corresponds to the link property definition type and has at least one relationship with the at least one node instance. The at least one node instance corresponds to the link target. The at least one relationship supports relating the at least one node of the link source to the at least one node instance of the link target. Content in the plurality of content repositories can then be managed based upon the VCR.

As used herein, the term inheritance (or extension) is defined as when an object extends or inherits from a parent object, it gains the functionality as described by that parent object. The object is also capable of modifying that functionality to suit the object's specific needs. For content types, the functionality that can be extended and/or modified is the parent type's property definitions. As used herein, the term subtype is defined as a content type that has extended another content type. This is typically the child in the parent-child relationship. As used herein, the term Supertype (or Base Type) is defined as a content type that has been extended by another content type. This is typically the parent in the parent-child relationship. As used herein, the term overload is defined as the process by which a user modifies a property definition specified by a supertype. As used herein, the term abstract type is defined as a type that cannot be "instantiated". A user cannot create a node of an abstract type. An abstract type may serve to be extended by other types (which could then have nodes instantiated) or a nested type within another type. As used herein, the term container type is defined as a type that contains other types as part of its data model. As used herein, the term contained type is defined as a type that is modeled within another type. This is done by the container type creating a property definition of type "nested type" which refers to the type to be nested. As used herein, the term container instance is defined as a node that is an instance of a container type. As used herein, the term contained instance is defined as a "node" that represents the property values of the nested property type within a container node. As used herein, the term link property type is defined as type of property definition that specifies a link to another node in the content management system. As used herein, the term link source is defined as the node containing the link property type property. As used herein, the term link target is defined as the target node to which a link source node's link property refers. Multiple link source nodes may reference the same target node. Further, link sources can target multiple link target nodes.

While the present invention is described with reference to an embodiment in which techniques for type inheritance, abstract types, nested types and link property types in a content management system are implemented in an application server in conformance with the J2EE Management Framework using executable programs written in the Java™ programming language, the present invention is not limited to the J2EE Management Framework nor the Java™ programming language. Embodiments may be practiced using other interconnectivity specifications or programming languages, i.e., JSP and the like without departing from the scope of the embodiments claimed. (Java™ is a trademark of Sun Microsystems, Inc.).

FIG. 1 is an exemplary illustration of functional system layers in various embodiments of the invention. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

A content repository 112 represents a searchable data store. Such systems can relate structured content and unstructured content (e.g., digitally scanned paper documents, Extensible Markup Language, Portable Document Format, Hypertext Markup Language, electronic mail, images, video and audio streams, raw binary data, etc.) into a searchable corpus. Content repositories can be coupled to or integrated with content management systems. Content management systems can provide for content workflow management, versioning, content review and approval, automatic content classification, event-driven content processing, process tracking and content delivery to other systems. By way of illustration, if a user fills out a loan application on a web portal, the portal can forward the application to a content repository which, in turn, can contact a bank system, receive notification of loan approval, update the loan application in the repository and notify the user by rendering the approval information in a format appropriate for the web portal.

A virtual or federated content repository (hereinafter referred to as "VCR") is a logical representation of one or more individual content repositories. For example, the VCR provides a single access point to multiple repositories from the standpoint of application layer 120 but does not shield from the user that there is more than one repository available. The VCR can also add content services to repositories that natively lack them. Typically, the user interacts with the VCR by specifying which repository an action is related to (such as adding a new node), or performing an action that applies to all repositories (such as searching for content). In various embodiments and by way of illustration, this can be accomplished in part by use of an API (application program interface) 100 and an SPI (service provider interface) 102. An API describes how entities in the application layer can interface with some program logic or functionality. The application layer can include applications (and subdivisions thereof) that utilize the API, such as processes, threads, servlets, portlets, objects, libraries, and other suitable application components. An SPI describes how a service provider (e.g., a content repository, a content management system) can be integrated into a system of some kind. The SPI isolates direct interaction with repositories from the API. In various embodiments, this can be accomplished at run-time wherein the API library dynamically links to or loads the SPI library. In another embodiment, the SPI can be part of a server process such that the API and the SPI can communicate over a network. The SPI can communicate with the repositories using any number of means including, but not limited to, shared memory, remote procedure calls and/or via one or more intermediate server processes.

Content repositories may comprise a variety of interfaces for connecting with the repository. For example, as shown in FIG. 1, a BEA format repository 113*a* provided by BEA Systems, Inc. of San Jose, Calif., a Documentum format repository 113*b*, provided by EMC Corp. of Hopkinton, Mass., and a JSR-170 compliant repository 113*c* may be integrated into a VCR and made accessible via a single federated API 100 by SPI 102. Individual SPI implementations 105*a*, 105*b*, 105*c* provide format specific service provider interfaces to the BEA format repository 113*a*, the Documentum format repository 113*b*, and the JSR-170 format repository 113*c*, respectively. It is noteworthy that not all of the formats illustrated in FIG. 1 will be present in all embodiments. Further, some embodiments will include other repository formats not illustrated by FIG. 1 for brevity.

API's and SPI's can be specified as a collection of classes/interfaces, data structures and/or methods/functions that work together to provide a programmatic means through which VCR service(s) can be accessed and utilized. By way of illustration, APIs and SPIs can be specified in an object-oriented programming language, such as Java™ (available from Sun Microsystems, Inc. of Mountain View, Calif.) and C# (available from Microsoft Corp. of Redmond, Wash.). The API and SPI can be exposed in a number of ways, including but not limited to static libraries, dynamic link libraries, distributed objects, servers, class/interface instances, and other suitable means.

In various embodiments, the API presents a unified view of all repositories to the application layer such that navigation, CRUD operations (create, read, update, delete), versioning, workflows, and searching operations initiated from the application layer operate on the repositories as though they were one. Repositories that implement the SPI can "plug into" the VCR. The SPI includes a set of interfaces and services that support API functionality at the repository level. The API and SPI share a content model that represents the combined content of all repositories as a hierarchical namespace of nodes. Given a node N, nodes that are hierarchically inferior to N are referred to as children of N, whereas nodes that are hierarchically superior to N are referred to as parents of N. The topmost level of the hierarchy is termed the federated root. There is no limit to the depth of the hierarchy. In various embodiments, repositories are children of the federated root. Each repository can itself have children.

By way of illustration, content mining facilities 104, processes/threads 106, tag libraries 108, integrated development environments (IDEs) 110, and other libraries 118 can all utilize the API to interact with a VCR. An IDE can provide the ability for a user to interactively build workflows and/or content views. Content mining facilities can include services for automatically extracting content from the VCR based on parameters. Java ServerPages™ tag libraries enable portals to interact with the VCR and surface its content on web pages. (Java ServerPages™ is available from Sun Microsystems, Inc.) In addition, it will be apparent to those of skill in the art that many other types of applications and software components utilize the API and are, as such, fully within the scope and spirit of the present disclosure.

In various embodiments, the API can include optimizations to improve the performance of interacting with the VCR. One or more caches 116 can be used to buffer search results and/or recently accessed nodes. Some implementations may include additional cache 119 in one or more repositories. In various embodiments, a cache can include a node cache and/or a binary cache. A node cache can be used to provide fast access to recently accessed nodes whereas a binary cache can be used to provide fast access to the content/data associated with each node in a node cache. The API can also provide a configuration facility 114 to enable applications, tools and libraries to configure caches and the VCR. In various embodiments, this facility can be can be configured via Java Management Extension (JMX) (available from Sun Microsystems, Inc.).

In various embodiments, a model for representing hierarchy information, content and data types is shared between the API and the SPI. In this model, a node can represent hierarchy information, content or a schema information. Hierarchy nodes can serve as a containers for other nodes in the namespace akin to a file subdirectory in a hierarchical file system. Schema nodes represent predefined data types. Content nodes represent content/data. Nodes can have a shape defined by their properties. A property associates a name, a data type and an optional a value that is appropriate for the type. In certain of these embodiments, the properties of content nodes contain values. By way of an illustration, a type can be any of the types described in Table 1. Those of skill in the art will appreciate that many more types are possible and fully within the scope and spirit of the present disclosure.

TABLE 1

Exemplary Property Types in Various Embodiments

| PROPERTY TYPE | DESCRIPTION |
| --- | --- |
| Basic | Text, a number, a date/time, a Boolean value, a choice, an image, a sound, a bit mask, an audio/visual presentation, binary data. |
| Link | A pointer/reference to data that lives "outside" of a node. |
| Lookup | An expression to be evaluated for locating another node in the VCR |
| Database Mapped (or schema) | Maps to an existing database table or view. |
| Nested | One or more schemas define individual properties. |

In various embodiments, a property can also indicate whether it is required, whether it is read-only, whether it provides a default value, and whether it specifies a property choice. A property choice indicates if a property is a single unrestricted value, a single restricted value, a multiple unrestricted value, or a multiple restricted value. Properties that are single have only one value whereas properties that are multiple can have more than one value. If a property is restricted, its value(s) are chosen from a finite set of values. But if a property is unrestricted, any value(s) can be provided for it. A property can also be designated as a primary property. By way of illustration, the primary property of a node can be considered its default content. For example, if a node contained a binary property to hold an image, it could also contain a second binary property to represent a thumbnail view of the image. If the thumbnail view was the primary property, software applications such as browser could display it by default.

A named collection of one or more property types is a schema. A schema node is a place holder for a schema. In various embodiments, schemas can be used to specify a node's properties. By way of illustration, a Person schema with three properties (Name, Address and DateofBirth) can be described for purposes of discussion as follows:

Schema Person = {
<Name=Name, Type=Text>,
<Name=Address, Type=Address>,
<Name=DateofBirth, Type=Date>}

Various embodiments allow a node to be defined based on a schema. By way of illustration, a content node John can be given the same properties as the schema Person:

Content Node John is a Person

In this case, the node John would have the following properties: Name, Address and DateofBirth. Alternatively, a node can use one or more schemas to define individual properties. This is sometimes referred to as nested types. In the following illustration, John is defined having an Info property that itself contains the properties Name, Address and DateofBirth. In addition, John also has a CustomerId property:

Content Node John = {
<Name=Info, Type=Person>,
<Name=CustomerId, Type=Number> }

Schemas can be defined logically in the VCR and/or in the individual repositories that form the VCR. In certain embodiments, schemas can inherit properties from at least one other schema. Schema inheritance can be unlimited in depth. That is, schema A can inherit from schema B, which itself can inherit from schema C, and so on. If several schemas contain repetitive properties, a "base" schema can be configured from which the other schemas can inherit. For example, a Person schema containing the properties Name, Address and DateofBirth, can be inherited by an Employee schema which adds its own properties (i.e., Employee ID, Date of Hire and Salary):

Schema Employee inherits from Person = {
<Name=EmployeeID, Type= Number>,
<Name=DateofHire, Type=Date>,
<Name=Salary, Type= Number> }

Thus, as defined above the Employee schema has the following properties: Name, Address, DateofBirth, EmployeeID, DateofHire and Salary. If the Person schema had itself inherited properties from another schema, those properties would also belong to Employee.

In various embodiments, nodes have names/identifiers and can be specified programmatically or addressed using a path that designates the node's location in a VCR namespace. By way of illustration, the path can specify a path from the federated root ('/') to the node in question ('c'):

/a/b/c

In this example, the opening '/' represents the federated root, 'a' represents a repository beneath the federated root, 'b' is a hierarchy node within the 'a' repository, and 'c' is the node in question. The path can also identify a property ("property1") on a node:

/a/b/c.property1

In aspects of these embodiments, the path components occurring prior to the node name can be omitted if the system can deduce the location of the node based on context information.

In various embodiments, a schema defined in one repository or the VCR can inherit from one or more schemas defined in the same repository, a different repository or the VCR. In certain aspects of these embodiments, if one or more of the repositories implicated by an inherited schema do not support inheritance, the inheriting schema can be automatically defined in the VCR by the API. In one embodiment, the inheriting schema is defined in the VCR by default.

By way of illustration, the Employee schema located in the Avitech repository inherits from the Person schema located beneath the Schemas hierarchy node in the BEA repository:

Schema /Avitech/Employee inherits from /BEA/Schemas/Person = {
<Name=EmployeeID, Type= Number>,
<Name=DateofHire, Type=Date>,
<Name=Salary, Type= Number> }

In various embodiments, the link property type (see Table 1) allows for content reuse and the inclusion of content that may not be under control of the VCR. By way of illustration, the value associated with a link property can refer/point to any of the following: a content node in a VCR, an individual property on a content node in a VCR, a file on a file system, an object identified by a URL (Uniform Resource Locator), or any other suitable identifier. In various embodiments, when editing a content node that has a link property type, a user can specify the link destination (e.g., using a browser-type user interface). In certain aspects of these embodiments, if a link refers to a content node or a content node property that has been moved, the link can be resolved automatically by the system to reflect the new location.

In various embodiments, a value whose type is lookup (see Table 1) can hold an expression that can be evaluated to search the VCR for instances of content node(s) that satisfy the expression. Nodes that satisfy the expression (if any) can be made available for subsequent processing. In various embodiments, a lookup expression can contain one or more expressions that can substitute expression variables from: the content node containing the lookup property, a user profile, anything in the scope of a request or a session. In various embodiments, an expression can include mathematical, logical and Boolean operators, function/method invocations, macros, SQL (Structured Query Language), and any other suitable query language. In various embodiments, an expression can be pre-processed one or more times to perform variable substitution, constant folding and/or macro expansion. It will be apparent to those of skill in the art that many other types of expressions are possible and fully within the scope and spirit of this disclosure.

In various embodiments, when editing a content node that has a lookup property type, the user can edit the expression through a user interface that allows the user to build the expression by either entering it directly and/or by selecting its constituent parts. In addition, the user interface can enable the user to preview the results of the expression evaluation.

Database mapped property types (see Table 1) allow information to be culled (i.e., mapped) from one or more database tables (or other database objects) and manipulated through node properties. By way of illustration, a company might have "content" such as news articles stored as rows in one or more RDBMS (Relational Database Management System) tables. The company might wish to make use of this "content" via their portal implementation. Further, they might wish to manage the information in this table as if it existed in the VCR. Once instantiated, a content node property that is of the database mapped type behaves as though its content is in the VCR (rather than the database table). In one embodiment, all API operations on the property behave the same but ultimately operate on the information in the database table.

In various embodiments, a given database mapped property type can have an expression (e.g., SQL) which, when evaluated, resolves to a row and a column in a database table (or resolves to any kind of database object) accessible by the system over one or more networks. A database mapped property will be able to use either native database tables/objects or database views on those tables/objects. It will be appreciated by those of skill in the art that the present disclosure is not limited to any particular type of database or resolving expression.

In aspects of certain embodiments, a schema can be automatically created that maps to any row in a database table. The system can inspect the data structure of the table and pre-populate the schema with database mapped properties corresponding to columns from the table. The table column names can be used as the default property names and likewise the data type of each column will determine the data type of each corresponding property. The system can also indicate in the schema, which properties correspond to primary key columns. If certain columns from the table are not to be used in the new schema, they can be un-mapped (i.e. deselected) by a user or a process. A content node can be based on such a schema and can be automatically bound to a row in a database table (or other database object) when it is instantiated. In various embodiments, a user can interactively specify the database object by browsing the database table.

While not required by all embodiments, some embodiments employ a display template (or "template") to display content based on a schema. Templates can implement various "views". By way of illustration, views could be "full", "thumbnail", and "list" but additional "views" could be defined by end-users. A full view can be the largest, or full page view of the content. A thumbnail view would be a very small view and a list view can be used when displaying multiple content nodes as a "list" on the page (e.g., a product catalog search results page). In various embodiments, the association between a schema and templates can be one-to-many. A template can be designated as the default template for a schema. In certain of these embodiments, templates can be designed with the aid of an integrated development environment (IDE). Other delivery mechanisms such as without limitation mobile phones, XML, and the like can be enabled by this technology.

In various embodiments and by way of illustration, display templates can be implemented using HTML (Hypertext Markup Language) and JSP (Java® Server Pages). By way of a further illustration, such a display template can be accessed from a web page through a JSP tag that can accept as an argument the identifier of a content node. Given the content node, the node's schema and associated default display template can be derived and rendered. Alternatively, the JSP tag can take an additional argument to specify a view other than the default. In another embodiment, display templates can be automatically generated (e.g., beforehand or dynamically at run-time) based on a content node's schema. In other embodiments, the view (e.g., full, thumbnail, list) can be determined automatically based on the contents of an HTTP request.

In various embodiments, a role is a dynamic set of users. By way of illustration, a role can be based on functional responsibilities shared by its members. In aspects of these embodiments, a role can be defined by one or more membership criteria. Role mapping is the process by which it is determined whether or not a user satisfies the membership criteria for a given role. For purposes of discussion, a role can be described as follows:

Role=PMembers+[Membership Criterial]

where PMembers is a set of user(s), group(s) and/or other role(s) that form a pool of potential members of this role subject to the Membership Criteria, if any. A user or a process can be in a role, if that user or process belongs to PMembers or satisfies the Membership Criteria. It is noteworthy that a user or process does not need to be a member of PMembers to be considered a member of the role. For example, it is possible to define a role with a criterion such as: "Only on Thursdays" as its membership criteria. All users would qualify as a member of this role on Thursdays. The Membership Criteria can include one or more conditions. By way of illustration, such conditions can include, but are not limited to, one or more (possibly nested and intermixed) Boolean, mathematical, functional, relational, and/or logical expressions. By way of illustration, consider the following Administrator role:

Administrator=Joe, Mary, SuperUser+CurrentTime>5:00 pm

The role has as its potential members two users (Joe and Mary) and users belonging to the user group named SuperUser. The membership criteria includes a condition that requires the current time to be after 5:00 pm. Thus, if a user is Joe, Marry or belongs to the SuperUser group, and the current time is after 5:00 pm, the user is a member of the Administrator role.

In various embodiments, roles can be associated with Resource(s). By way of illustration, a resource can be any system and/or application asset (e.g., VCR nodes and node properties, VCR schemas and schema properties, operating system resources, virtual machine resources, J2EE application resources, and any other entity that can be used by or be a part of software/firmware of some kind). Typically, resources can be arranged in one or more hierarchies such that parent/child relationships are established (e.g., the VCR hierarchical namespace and the schema inheritance hierarchy). In certain of these embodiments, a containment model for roles is followed that enables child resources to inherit roles associated with their parents. In addition, child resources can override their parents' roles with roles of their own.

In various embodiments, Membership Criteria can be based at least partially on a node's properties. This allows for roles that can compare information about a user/process to content in the VCR, for example. In various embodiments, a node's property can be programmatically accessed using dot notation: Article.Creator is the Creator property of the Article node. By way of illustration, assume an Article node that represents a news article and includes two properties: Creator and State. A system can automatically set the Creator property to the name of the user that created the article. The State property indicates the current status of the article from a publication workflow standpoint (e.g., whether the article is a draft or has been approved for publication). In this example, two roles are defined (see Table 2).

TABLE 2

Exemplary Roles in an Embodiment

| ROLE NAME | ASSOCIATED WITH | PMEMBERS | MEMBERSHIP CRITERIA |
| --- | --- | --- | --- |
| Submitter | Article | Article.Creator | Article.State = Draft |
| Approver | Article | Editor | Article.State = (Submitted or Approved) |

The Submitter and Approver roles are associated with the Article node. Content nodes instantiated from this schema will inherit these roles. If a user attempting to access the article is the article's creator and the article's state is Draft, the user can be in the Submitter role. Likewise, if a user belongs to an Editor group and the article's state is Submitted or Approved, then the user can belong to the Approver role.

In various embodiments, a policy can be used to determine what capabilities or privileges for a given resource are made available to the policy's Subjects (e.g., user(s), group(s) and/or role(s)). For purposes of discussion, a policy can be described as follows:

Policy=Resource+Privilege(s)+Subjects+[Policy Criteria]

Policy mapping is the process by which Policy Criteria, if any, are evaluated to determine which Subjects are granted access to one or more Privileges on a Resource. Policy Criteria can include one or more conditions. By way of illustration, such conditions can include, but are not limited to, one or more (possibly nested and intermixed) Boolean, mathematical, functional, relational, and/or logical expressions. Aspects of certain embodiments allow policy mapping to occur just prior to when an access decision is rendered for a resource.

Similar to roles, in certain of these embodiments a containment model for policies is followed that enables child resources to inherit policies associated with their parents. In addition, child resources can override their parents' polices with policies of their own.

In various embodiments, policies on nodes can control access to privileges associated with the nodes. By way of illustration, given the following policies:

Policy1 = Printer504 + Read/View + Marketing
Policy2 = Printer504 + All + Engineering the Marketing role can read/view and browse the Printer504 resource whereas the Engineering role has full access to it ("All"). These privileges are summarized in Table 3. Policy1 allows a user in the Marketing role to merely view the properties of Printer504 whereas Policy2 allows a user in the Engineering role to view and modify its properties, to create content nodes based on Printer504 (assuming it is a schema), and to delete the resource.

TABLE 3

Exemplary Privileges for a "Printer504" Node in Various Embodiments

| ROLE | CREATE | READ/VIEW | UPDATE | DELETE | BROWSE |
| --- | --- | --- | --- | --- | --- |
| Marketing |  | x |  |  | x |
| Engineering | x | x | x | x | x |

Aspects of certain of these embodiments include an implied hierarchy for privileges wherein child privilege(s) of a parent privilege are automatically granted if the parent privilege is granted by a policy.

In various embodiments, the containment models for polices and roles are extended to allow the properties of a node to inherit the policies and roles that are incident on the node. Roles/polices on properties can also override inherited roles/polices. For purposes of illustration, assume the following policy on a Power property of Printer504:

Policy3=Printer504.Power+Update+Marketing

In Policy3, the Marketing role is granted the right to update the Power property for the printer resource Printer504 (e.g., control whether the printer is turned on or off). By default, the Read/View property is also granted according to an implied privilege hierarchy. (There is no Browse privilege for this property.) See Table 4. Alternatively, if there was no implied privilege hierarchy, the Power property would inherit the read/view privilege for the Marketing role from its parent, Printer504. Although no policy was specified for the Power property and the Engineering role, the privileges accorded to the Engineering role can be inherited from a parent node.

These privileges are summarized in Table 4.

TABLE 4

Exemplary Privileges for the "Power" Property in the "Printer504" Node

| ROLE | CREATE | READ/VIEW | UPDATE | DELETE |
|---|---|---|---|---|
| Marketing |  | x | x |  |
| Engineering | X | x | x | x |

In various embodiments, the ability to instantiate a node based on a schema can be privileged. This can be used to control which types of content can be created by a user or a process. By way of illustration, assume the following policy:

Policy4=Press_Release+Instantiate+Marketing, Manager

Policy4 specifies that nodes created based on the schema Press_Release can only be instantiated by users/processes who are members of the Marketing and/or Manager roles. In aspects of certain of these embodiments, user interfaces can use knowledge of these policies to restrict available user choices (e.g., users should only be able to see and choose schemas on which they have the Instantiate privilege).

In various embodiments, policies can be placed on schemas. For purposes of illustration, assume the following policies:

Policy5 = Press_Release + Read/View + Everyone
Policy6 = Press_Release + All + Public_Relations

TABLE 5

Exemplary Privileges for the "Press Release" Schema

| ROLE | CREATE INSTANCE | READ/ VIEW | UPDATE | DELETE | BROWSE |
|---|---|---|---|---|---|
| Everyone |  | X |  |  | x |
| Public Relations | x | X | x | x | x |

With reference to Table 5 and by way of illustration, assume a content node instance was created based on the Press Release schema. By default, it would have the same roles/polices as the Press Release schema. If a policy was added to the node giving a role "Editor" the privilege to update the node, the result would be additive. That is, Everyone and Public Relations would maintain their original privileges.

In various embodiments, policies can be placed on properties within a schema, including property choices. (Property choices are a predetermined set of allowable values for a given property. For example, a "colors" property could have the property choices "red", "green" and "blue".)

Figure 2:
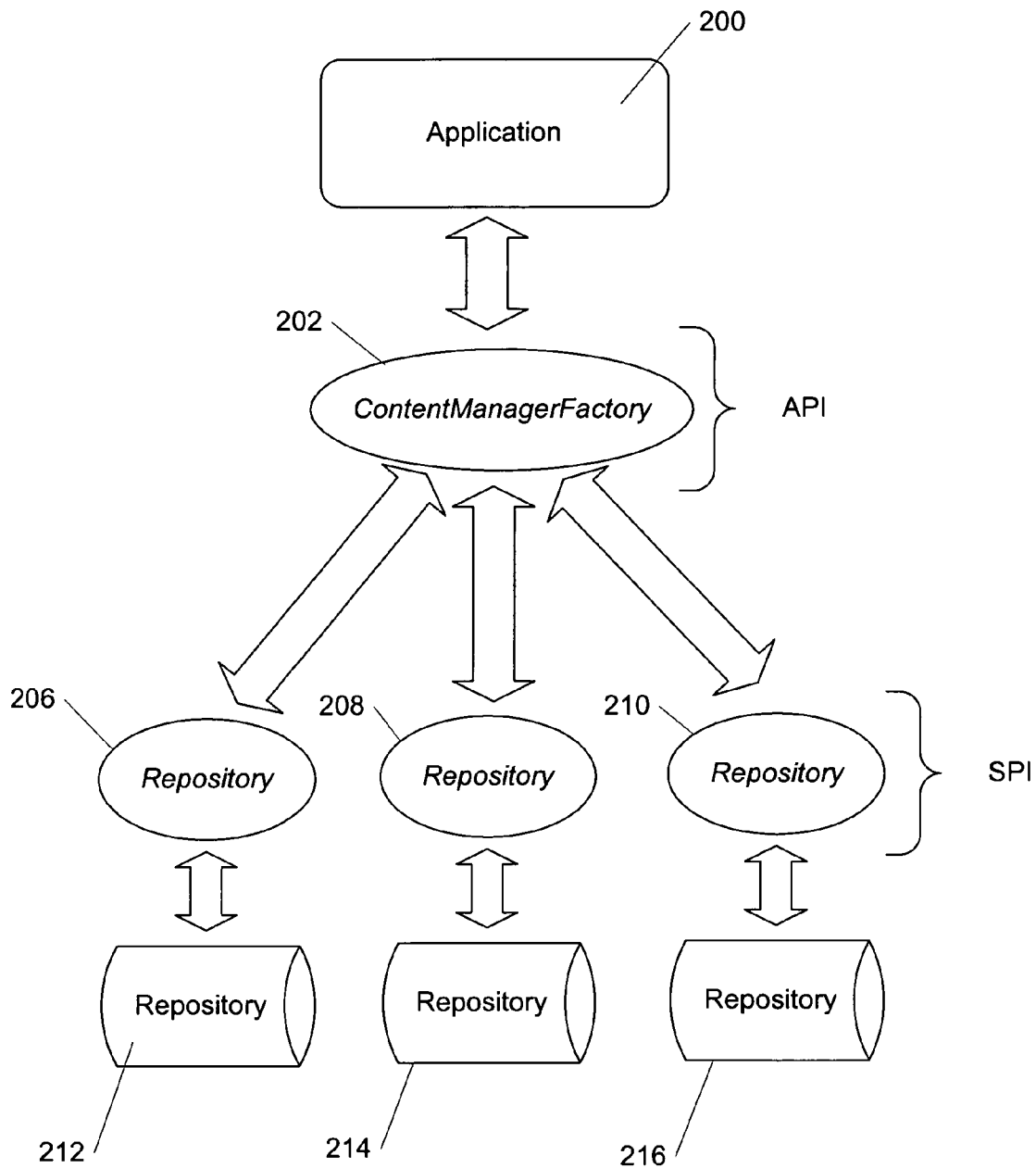
FIG. 2 is an exemplary illustration of objects/interfaces that can be used to interface repositories comprising content in various embodiments.

FIG. 2 is an exemplary illustration of objects/interfaces that can be used to interface repositories comprising content in various embodiments. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

The ContentManagerFactory 202 can serve as a representation of an access device from an application program's 200 point of view. In aspects of these embodiments, the ContentManagerFactory attempts to connect all available repositories to the device (e.g., 212-216); optionally with user or process credentials. In various embodiments, this can be based on the Java™ Authentication and Authorization Service (available from Sun Microsystems, Inc.). Those of skill in the art will recognize that many authorization schemes are possible without departing from the scope and spirit of the present disclosure. Each available content repository is represented by an SPI Repository object 206-210. In an embodiment, the ContentManagerFactory can invoke a connect( ) method on the set of Repository objects. Alternatively, in some embodiments, the notion of "connecting" to a repository is not exposed to users. In various embodiments, the ContentManagerFactory returns a list of repository session objects to the application program, one for each repository for which a connection was attempted. Any error in the connection procedure can be described by the session object's state. In another embodiment, the ContentManagerFactory can connect to a specific repository given the repository name. In various embodiments, the name of a repository can be a URI (uniform resource identifier).

Type Inheritance

Figure 3A:
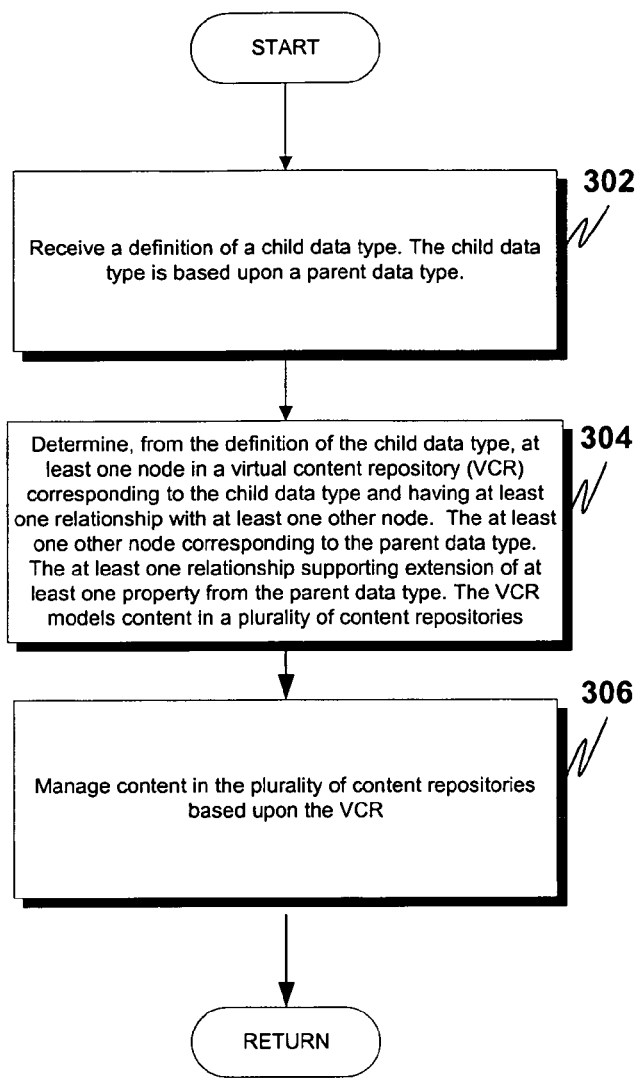
FIGS. 3A-3C are operational flow diagrams illustrating a high level overview of techniques for type inheritance, nested types and link property types in a content management system in embodiments.

FIG. 3A is an operational flow diagram illustrating a high level overview of a technique for type inheritance in a content management system in an embodiment. As shown in FIG. 3A, a definition of a child data type is received (block 302). The child data type can be based upon a parent data type. One or more nodes in a virtual content repository (VCR) may be determined from the definition of the child data type (block 304). The node(s) correspond to the child data type and have at least one relationship with at least one other node. At least one other node corresponds to the parent data type. The at least one relationship supports extension of at least one property from the parent data type. The VCR models content in a plurality of content repositories. Content in the plurality of content repositories is managed (block 306) based upon the VCR.

In some embodiments, type Inheritance is limited to within the context of a single repository. In some embodiments, a static inheritance model is enforced. In other words, nodes of a type will have the same properties. In some embodiments, a singular model having unlimited depth is enforced. In other words, the inheritance model supports chain types: a->b-> c-> . . . ->z and so on. In some embodiments, a given type is restricted to inheriting from a single parent. In some embodiments, cyclical inheritance chains are blocked. In other words, an inheritance chain such as A->B->A cannot be formed. In some embodiments, an attempt to create a property definition by the child type with the same name as a parent type is blocked. In some embodiments, a child type is enabled to overload a given property definition. In some embodiments, retrieval of a node of a subtype does not require knowledge of the type's structure. Rather, this can be obtained by interrogating the type object. In some embodiments, when a user requests all nodes of a given type, nodes of the specified type and those of types that extend the specified type are returned. In some embodiments, nodes are prevented from being "downcast". In other words, if a user has an instance of a subtype, the node will behave like the subtype, not as an instance of the parent type. In some embodiments, the nodes are blocked from determining which properties are inherited from other types from which the nodes were instantiated. This can make the inheritance concept is transparent to nodes. Some embodiments support type security for each type and/or versioning of nodes.

The following scenario illustrate operation of an embodiment providing abstract data types:
  A user creates a type and at creation time indicates that the type is abstract. The abstract modifier is simply a boolean flag.
  The user then attempts to create a node from the abstract type. This operation should fail with indication that an instance of an abstract type is illegal.

The following scenario illustrate operation of an embodiment providing abstract data type updating:
  A user creates an abstract type.
  The user updates the type to disable the abstract modifier.
  The user is then able to create instances of this type.

The following scenario illustrates operation of an embodiment providing detection that an abstract data type is not abstract:
  A user creates a type—not specifying the abstract modifier. By default behavior the type is not abstract.
  The user creates an instance of this type.
  The user attempts to make the type abstract, with instances of the type in existence. This operation fails with indication that a type cannot be made abstract while it has instances.
  All instances of the type are then removed.
  The type can then be modified to become abstract.

The following scenario illustrates operation of an embodiment providing abstract data type removal:
  A user creates an abstract type.
  The user is free to remove this type at any time unless it is a supertype (and therefore engaged in type inheritance) or it is a nested type within another type. When the inheritance relationship is broken and the abstract type is no longer a supertype to another type, then it may be freely removed.

The following scenario illustrates operation of an embodiment providing abstract data type inheritance:
  A user creates an abstract type.
  The type may be used as a base type for inheritance. No behavior is implied by the selection of an abstract type as a base type. The abstract type's behavior does not change in being used as a base type, aside from the fact that it cannot be removed if a subtype has any instances.

Figure 4A:
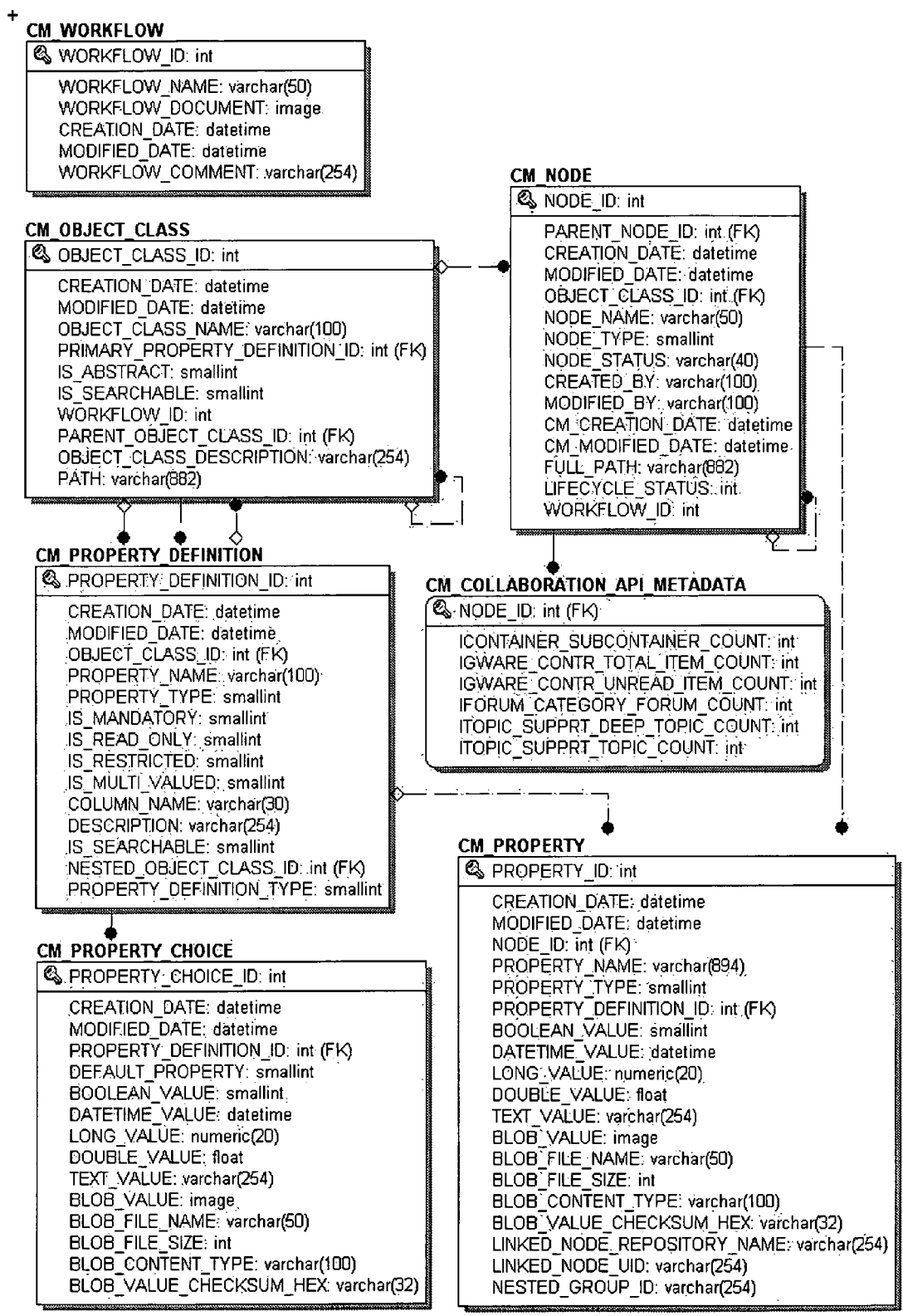
FIGS. 4A-4B are data diagram illustrating database fields and relationships supporting techniques for type inheritance, nested types and link property types in embodiments.
Figure 4B:

FIGS. 4A-4B are data diagrams illustrating database fields and relationships supporting inheritance of types, nested types and link property types in an embodiment. In FIG. 4A, IS_ABSTRACT (BOOLEAN), PARENT_OBJECT_CLASS_ID (LONG, NULL) and PATH (VARCHAR, NULL) columns are added to a CM_OBJECT_CLASS. A PROPERTY_DEFINITION_TYPE (INT) is added to a CM_PROPERTY_DEFINITION.

Nested Types

Figure 3B:
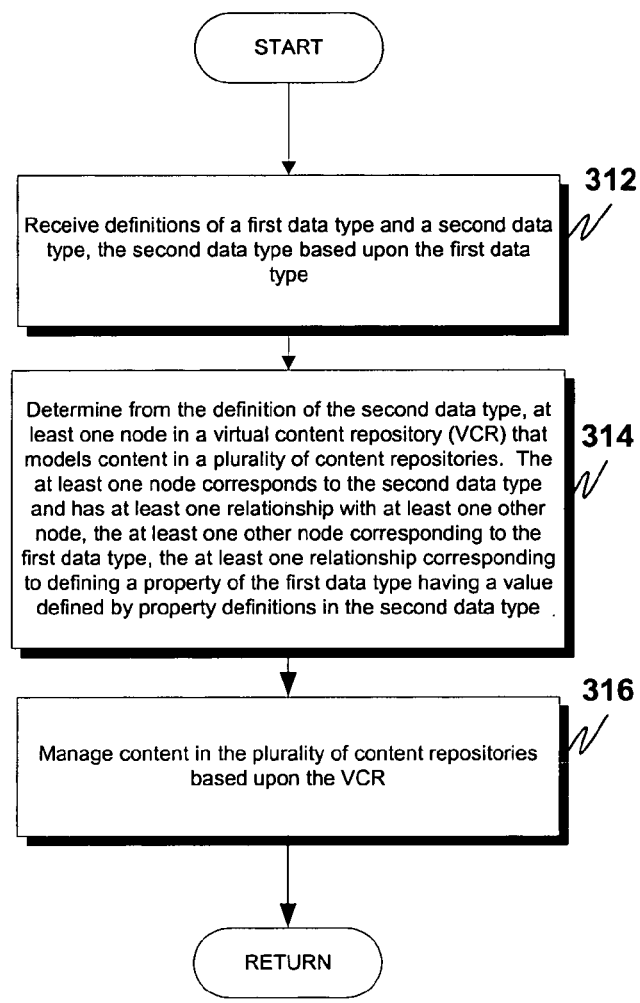

FIG. 3B is an operational flow diagram illustrating a high level overview of a technique for nested types in a content management system in an embodiment. As shown in FIG. 3B, definitions of a first data type and a second data type are received (block 312). The second data type based upon the first data type. At least one node is determined (block 314) from the definition of the second data type in a virtual content repository (VCR) that models content in a plurality of content repositories. The at least one node corresponds to the second data type and has at least one relationship with at least one other node. The at least one other node corresponds to the first data type. The at least one relationship corresponds to defining a property of the first data type having a value defined by property definitions in the second data type. Content in the plurality of content repositories is managed (block 316) based upon the VCR.

In some embodiments, nesting is limited to within the context of a single repository. In some embodiments, a model having unlimited depth is enforced. In other words, a user could model a type that nests another type that nests another type and so on. In some embodiments, cyclical nesting chains are blocked. In other words, a user is not allowed to model a "type A" which contains "type B" which contains "type C" which in turn contains "type A".

In some embodiments, nested instances are treated as "contained" nodes for the purpose of exposure in the API. In other words, embodiments return a node or some other structure that represents the set of property values that make up the "contained node" when a user invokes a method for a property that returns a nested type.

In some embodiments, properties may be updated by building the nested hierarchy. In some embodiments, nested instances are managed explicitly by their containing instances. There is no representation to the user that a nested instance exists outside of the containing instance. In some embodiments, a nested type and/or a container type cam be abstract types. In some embodiments, it is possible to have more than one instance of the nested type, i.e., the type is multivalued.

In some embodiments, any type can have a primary property definition defined. If that type gets nested within another type, the primary property definition has no affect on the container type. The container type is limited to understanding a primary property definition defined for that particular type, but not for any of the nested types. A nested type in a container type can have one or more of the following primary property definitions:
  Property Name—Property definitions of container and nested types don't interrelate and therefore no restriction on their names apply. It is perfectly legal to have a "name" property definition in both a container type and within a type the container nests.
  Property Type—Represented as a nested property type.
  Mandatory—Allowed.
  Read Only—Not allowed (though property definitions w/in the nested type can be read only).
  Restricted—Not allowed. When a user selects the "nested type" for a property definition, they may not specify a property choice (and therefore a default value) for the nested instance.
  Multi Valued—More than one instance of the nested type permitted.
  Column Name—Not allowed.

A container type can have the following property definitions for CRUD operations:
  For the container type property definition (that represents the nested type, i.e. homeAddress), all CRUD actions are allowable except for column name or restriction (which make no sense to have defined for a nested type).
  For the nested type property definitions—the same update and delete rules apply as for property definitions that haven't been nested, except the presence of the instances/nodes for the nested and container types is checked.

In some embodiments, a containing type property returns the nested type instance as a Property with a Value of java type Property [ ], called nestedValue. Specifically, when a property is obtained from a node that represents a nested type (i.e., homeAddress), a Property with a Value that has been instantiated as a Property[ ] containing all of the values for each property defined in the address type, will be returned.

In some embodiments, type level security and node level security are provided. In type level security, READ capability of the nested type is required to create the containment association. Further, a user without READ capability on a nested type cannot read the container type. In node level security, CCI of container and all nested types is required.

In some embodiments, nested types can be searched. For example, a search for City="Boulder" returns all nodes with a PD name of "City" with a value of "Boulder", regardless of type.

In some embodiments, nested types can interact with other type features. For example:

Polymoprhism of nested types is disallowed.

Types may be nested at any level (parent, child, etc)

Any nested type may be inherited

The following scenario illustrate operation of an embodiment providing abstract type nested:

A user creates an abstract type.

The type may be used as a nested type. No behavior is implied by the selection of an abstract type as a nested type. The abstract type's behavior does not change in being used as a nested type, aside from the fact that it cannot be removed if a container type has any instances.

FIGS. 4A-4B are data diagrams illustrating database fields and relationships supporting inheritance of types, nested types and link property types in an embodiment. In FIG. 4A, a column NESTED_OBJECT_CLASS_ID (of type NUMBER, to be a FK to CM_OBJECT_CLASS) is added to the CM_PROPERTY_DEFINITION table. The PROPERTY_NAME in the CM_PROPERTY table is altered to be about 900 chars wide and a column NESTED_GROUP_ID (of type VARCHAR(254) null) is added. In FIG. 4B, the PROPERTY_NAME in the CMV_PROPERTY table is altered to be about 900 chars wide.

Link Property Types

Figure 3C:
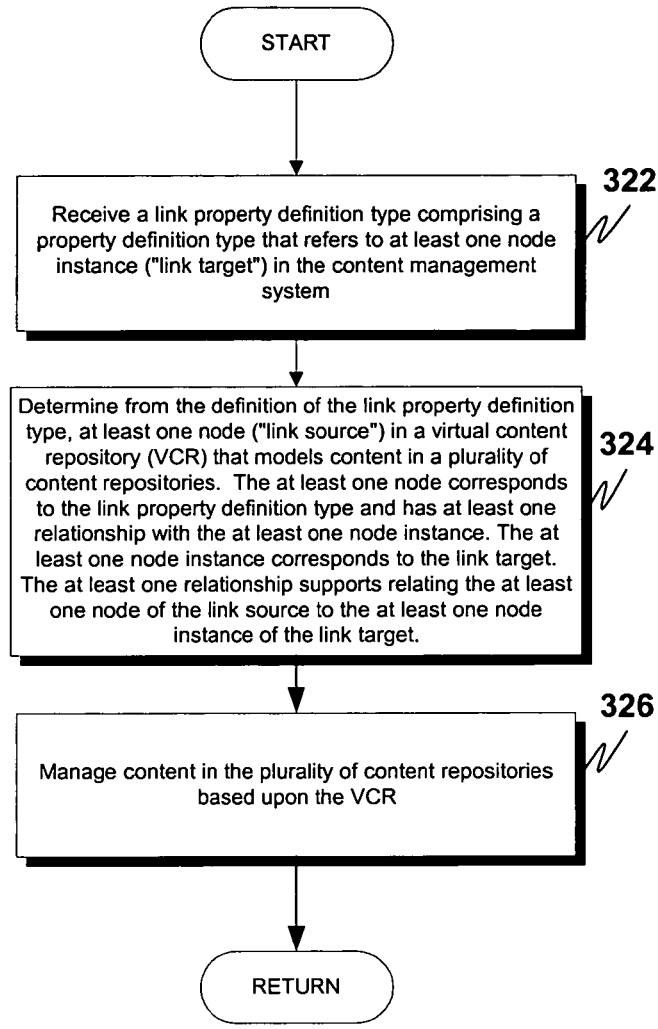

FIG. 3C is an operational flow diagram illustrating a high level overview of a technique for link property types in a content management system in an embodiment. As shown in FIG. 3C, a link property definition type comprising a property definition type that refers to at least one node instance ("link target") in the content management system is received (block 322). At least one node ("link source") is determined from the definition of the link property definition type in a virtual content repository (VCR) that models content in a plurality of content repositories (block 324). The at least one node corresponds to the link property definition type and has at least one relationship with the at least one node instance. The at least one node instance corresponds to the link target. The at least one relationship supports relating the at least one node of the link source to the at least one node instance of the link target. Content in the plurality of content repositories is managed (block 326) based upon the VCR. It is noteworthy that link sources can target multiple link target nodes.

In some embodiments, a link target can refer to any node in the repository regardless of ObjectClass type, or whether or not it is a content or hierarchy node. In some embodiments, there is no limit to the number of link property definitions that can be placed on a given type. In some embodiments, a link property definition type will not permit the creation of property choices and therefore default values for the property.

In some embodiments, when a method to retrieve a property is invoked on the node to retrieve the link property value, the following processing will occur:
If the target node exists, the target node will be retrieved.
If the target node has not yet been specified, the getProperty( ) method will return null.
If the target node has been specified, but does not exist, an exception type that extends RepositoryException will be thrown.

In some embodiments, a node which other nodes have as a link property target can be deleted. In some embodiments, existence of a link property target node is verified when a method for setting a property is invoked. In some embodiments, if the link target node is not null and the node does not exist, an exception will be thrown. In some embodiments, a node's properties may be versioned, but versioning is not performed on any nodes to which a link property refers. In some embodiments, linked property types cannot be used in search.

FIGS. 4A-4B are data diagrams illustrating database fields and relationships supporting inheritance of types, nested types and link property types in an embodiment. In FIG. 4A, a LINKED_NODE_UID column (FK to CM_NODE) is added to CM_PROPERTY. In FIG. 4B, a LINKED_NODE_UID column (FK to CM_NODE) is added to CMV_VALUE.

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing mechanisms and methods for type inheritance, nested types and link property types in a content management system as discussed herein.

Figure 5:
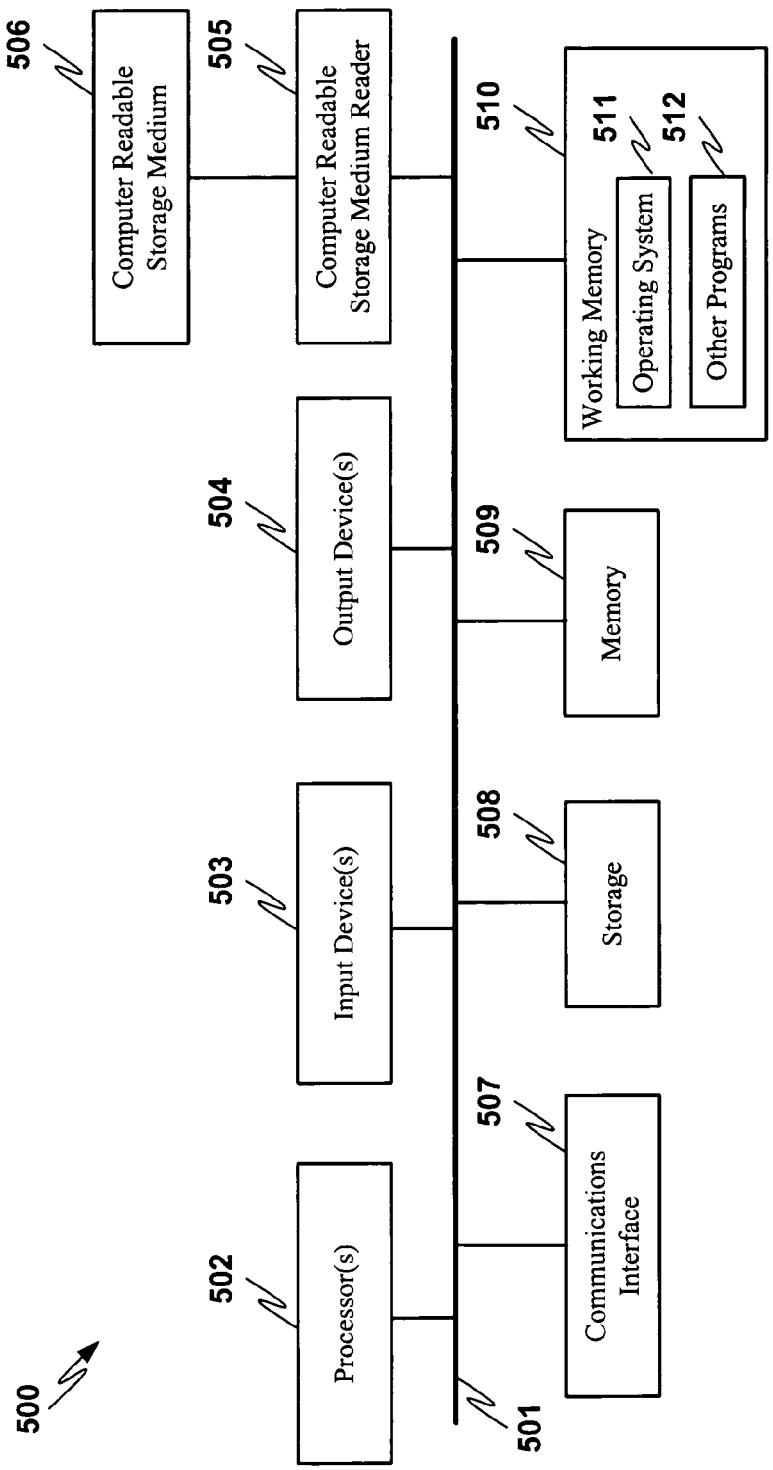
FIG. 5 is a hardware block diagram of an example computer system, which may be used to embody one or more components in an embodiment.

FIG. 5 illustrates an exemplary processing system 500, which can comprise one or more of the elements of FIG. 1. Turning now to FIG. 5, an exemplary computing system is illustrated that may comprise one or more of the components of FIG. 1. While other alternatives might be utilized, it will be presumed for clarity sake that components of the systems of FIG. 1 are implemented in hardware, software or some combination by one or more computing systems consistent therewith, unless otherwise indicated.

Computing system 500 comprises components coupled via one or more communication channels (e.g., bus 501) including one or more general or special purpose processors 502, such as a Pentium®, Centrino®, Power PC®, digital signal processor ("DSP"), and so on. System 500 components also include one or more input devices 503 (such as a mouse, keyboard, microphone, pen, and so on), and one or more output devices 504, such as a suitable display, speakers, actuators, and so on, in accordance with a particular application. (It will be appreciated that input or output devices can also similarly include more specialized devices or hardware/software device enhancements suitable for use by the mentally or physically challenged.)

System 500 also includes a machine readable storage media reader 505 coupled to a machine readable storage medium 506, such as a storage/memory device or hard or removable storage/memory media; such devices or media are further indicated separately as storage 508 and memory 509, which may include hard disk variants, floppy/compact disk variants, digital versatile disk ("DVD") variants, smart cards, read only memory, random access memory, cache memory, and so on, in accordance with the requirements of a particular application. One or more suitable communication interfaces 507 may also be included, such as a modem, DSL, infrared, RF or other suitable transceiver, and so on for providing inter-device communication directly or via one or more suitable private or public networks or other components that may include but are not limited to those already discussed.

Working memory 510 further includes operating system ("OS") 511 elements and other programs 512, such as one or more of application programs, mobile code, data, and so on for implementing system 500 components that might be stored or loaded therein during use. The particular OS or OSs may vary in accordance with a particular device, features or other aspects in accordance with a particular application (e.g. Windows®, WindowsCE™, Mac™, Linux, Unix or Palm™ OS variants, a cell phone OS, a proprietary OS, Symbian™, and so on). Various programming languages or other tools can also be utilized, such as those compatible with C variants (e.g., C++, C#), the Java™ 2 Platform, Enterprise Edition ("J2EE") or other programming languages in accordance with the requirements of a particular application. Other programs 512 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a learning integration system or other component may be communicated transitionally or more persistently from local or remote storage to memory (SRAM, cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory, (e.g., or memory 509) in accordance with a particular application.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A method for providing a link property definition type mechanism in a content management system, the method comprising:
   providing a virtual content repository (VCR) with a plurality of content repositories;
   associating the VCR with an application programming interface (API), wherein a user of the VCR uses the API to manipulate content in the plurality of content repositories in a programming language;
   modeling content in the plurality of content repositories using a general service provider interface (SPI), wherein the general SPI isolates direct interaction with each content repository in the plurality of content repositories from the API;
   associating a plurality of format specific content repositories with the general SPI, wherein each format specific content repository is associated with the general SPI through a format specific SPI implementation, and wherein each format specific SPI implementation connects indirectly with the API through the general SPI and provides a different format specific SPI for a different format specific content repository;
   providing a link property definition type that relates a plurality of source nodes to a plurality of target nodes, wherein one source node of the plurality of source nodes is a first node within a first content repository in the VCR, and one target node of the plurality of target nodes is a second node in a second content repository in the VCR, wherein one of the first content repository and the second content repository uses a format specific SPI that is different from the general SPI;
   instantiating a software object type in the programming language using the API, wherein the software object type is associated with the link property definition type;
   accessing, via an instance of the software object type and the API, said target node from said source node through both the general SPI and the format specific SPI, based on the definition of the link property definition type; and
   managing content in the plurality of content repositories based upon the VCR.

2. The method of claim 1, further comprising:
   receiving a specification of the link property definition type.

3. The method of claim 1, further comprising:
   blocking creation of property choices for the link property definition type.

4. The method of claim 3, further comprising:
blocking specifying default values for a property.

5. The method of claim 1, further comprising:
retrieving a property of the first node by at least one of:
  retrieving a target node when the target node exists, wherein the target node is a node in the second content repository;
  returning null when a target node has not yet been specified; and
  raising an exception.

6. The method of claim 1, further comprising:
permitting a node which other nodes have as a link property target to be deleted.

7. The method of claim 1, further comprising:
relating the first node to another target node of the plurality of target nodes during operations on the VCR.

8. The method of claim 1, further comprising:
associating the general SPI with a general SPI library, and the general SPI library is at least one of linked to and loaded in at run-time by an API library that is associated with the API.

9. A machine-readable storage medium carrying one or more sequences of instructions for providing a link property definition type mechanism in a content management system, which instructions, when executed by one or more processors, cause the one or more processors to carry out the steps of:
  providing a virtual content repository (VCR) with a plurality of content repositories;
  associating the VCR with an application programming interface (API), wherein a user of the VCR uses the API to manipulate content in the plurality of content repositories in a programming language;
  modeling content in the plurality of content repositories using a general service provider interface (SPI), wherein the general SPI isolates direct interaction with each content repository in the plurality of content repositories from the API;
  associating a plurality of format specific content repositories with the general SPI, wherein each format specific content repository is associated with the general SPI through a format specific SPI implementation, and wherein each format specific SPI implementation connects indirectly with the API through the general SPI and provides a different format specific SPI for a different format specific content repository;
  providing a link property definition type that relates a plurality of source nodes to a plurality of target nodes, wherein one source node of the plurality of source nodes is a first node within a first content repository in the VCR, and one target node of the plurality of target nodes is a second node in a second content repository in the VCR, wherein one of the first content repository and the second content repository uses a format specific SPI that is different from the general SPI;
  instantiating a software object type in the programming language using the API, wherein the software object type is associated with the link property definition type;
  accessing, via an instance of the software object type and the API, said target node from said source node through both the general SPI and the format specific SPI, based on the definition of the link property definition type; and
  managing content in the plurality of content repositories based upon the VCR.

10. The machine-readable storage medium as recited in claim 9, further include instructions for carrying out the step of:
receiving a specification of the link property definition type.

11. The machine-readable storage medium as recited in claim 9, further include instructions for carrying out the step of:
blocking creation of property choices for the link property definition type.

12. The machine-readable storage medium as recited in claim 11, wherein the instructions for carrying out the step of blocking creation of property choices for a link property definition type include instructions for carrying out the step of:
blocking specifying default values for a property.

13. The machine-readable storage medium as recited in claim 9, further include instructions for carrying out the step of:
retrieving a property of the first node by at least one of:
  retrieving a target node when the target node exists, wherein the target node is a node in the second content repository;
  returning null when a target node has not yet been specified; and
  raising an exception.

14. The machine-readable storage medium as recited in claim 9, further include instructions for carrying out the step of:
permitting a node which other nodes have as a link property target to be deleted.

15. The machine-readable storage medium as recited in claim 9, wherein the instructions for carrying out the step of managing content in the plurality of content repositories based upon the VCR include instructions for carrying out the step of:
relating the first node to another target node of the plurality of target nodes during operations on the VCR.

16. An apparatus for providing a link property definition type mechanism in a content management system, the apparatus comprising:
  a processor; and
  one or more stored sequences of instructions which, when executed by the processor, cause the processor to carry out the steps of:
    providing a virtual content repository (VCR) with a plurality of content repositories;
    associating the VCR with an application programming interface (API), wherein a user of the VCR uses the API to manipulate content in the plurality of content repositories in a programming language;
    modeling content in the plurality of content repositories using a general service provider interface (SPI), wherein the general SPI isolates direct interaction with each content repository in the plurality of content repositories from the API;
    associating a plurality of format specific content repositories with the general SPI, wherein each format specific content repository is associated with the general SPI through a format specific SPI implementation, and wherein each format specific SPI implementation connects indirectly with the API through the general SPI and provides a different format specific SPI for a different format specific content repository;
    providing a link property definition type that relates a plurality of source nodes to a plurality of target nodes, wherein one source node of the plurality of source nodes is a first node within a first content repository in the VCR, and one target node of the plurality of target nodes is a second node in a second content repository in the VCR, wherein one of the first content repository and the second content repository uses a format specific SPI that is different from the general SPI;

instantiating a software object type in the programming language using the API, wherein the software object type is associated with the link property definition type;

accessing, via an instance of the software object type and the API, said target node from said source node through both the general SPI and the format specific SPI, based on the definition of the link property definition type; and managing content in the plurality of content repositories based upon the VCR.

* * * * *

UNITED STATES PATENT AND TRADEMARK OFFICE
CERTIFICATE OF CORRECTION

PATENT NO.         : 7,917,537 B2
APPLICATION NO.    : 11/438164
DATED              : March 29, 2011
INVENTOR(S)        : McVeigh et al.

It is certified that error appears in the above-identified patent and that said Letters Patent is hereby corrected as shown below:

On Title page 5, in column 2, under "Other Publications", line 52, delete "KDD 99," and insert -- KDD '99, --, therefor.

On page 6, in column 1, under "Other Publications", line 9, delete "Sighic" and insert -- Sigchi --, therefor.

In column 1, line 39, delete "2006; and" and insert -- 2006. --, therefor.

In column 10, line 54, delete "Criterial]" and insert -- Criteria] --, therefor.

In column 17, line 17, delete "Polymoprhism" and insert -- Polymorphism --, therefor.

In column 17, line 18, delete "etc)" and insert -- etc). --, therefor.

In column 17, line 20, delete "inherited" and insert -- inherited. --, therefor.

In column 20, line 1, delete "or" and insert -- storage device 508 or --, therefor.

Signed and Sealed this
Fourth Day of October, 2011

David J. Kappos
*Director of the United States Patent and Trademark Office*